US009391966B2

(12) United States Patent
Clark et al.

(10) Patent No.: US 9,391,966 B2
(45) Date of Patent: Jul. 12, 2016

(54) DEVICES FOR PROVIDING SECURE REMOTE ACCESS

(71) Applicant: Control4 Corporation, Salt Lake City, UT (US)

(72) Inventors: William Richard Clark, Salt Lake City, UT (US); Wallace Eric Smith, Salt Lake City, UT (US); John Mar, Salt Lake City, UT (US); Andrew Van Uitert, Salt Lake City, UT (US); Charles Alexander Hudson, Salt Lake City, UT (US); Clinton Perry, Salt Lake City, UT (US)

(73) Assignee: Control4 Corporation, Salt Lake City, UT (US)

( * ) Notice: Subject to any disclaimer, the term of this patent is extended or adjusted under 35 U.S.C. 154(b) by 1 day.

(21) Appl. No.: 13/790,538

(22) Filed: Mar. 8, 2013

(65) Prior Publication Data

US 2014/0259108 A1    Sep. 11, 2014

(51) Int. Cl.
    *H04L 29/06*    (2006.01)

(52) U.S. Cl.
    CPC ..................................... *H04L 63/08* (2013.01)

(58) Field of Classification Search
    None
    See application file for complete search history.

(56) References Cited

U.S. PATENT DOCUMENTS

| 6,816,842 | B1 * | 11/2004 | Singh | G06F 21/105 |
| | | | | 705/59 |
| 2003/0179746 | A1 * | 9/2003 | Moon | D06F 39/005 |
| | | | | 370/352 |
| 2005/0198534 | A1 * | 9/2005 | Matta | G06F 21/31 |
| | | | | 726/5 |
| 2005/0216302 | A1 * | 9/2005 | Raji | G06Q 30/02 |
| | | | | 705/314 |
| 2006/0080734 | A1 * | 4/2006 | Kim | H04L 12/2803 |
| | | | | 726/15 |
| 2006/0155850 | A1 * | 7/2006 | Ma | H04L 29/06027 |
| | | | | 709/226 |
| 2006/0167985 | A1 * | 7/2006 | Albanese | H04L 63/08 |
| | | | | 709/203 |

(Continued)

FOREIGN PATENT DOCUMENTS

JP    2566109 A2 *    3/2013    .......... H04L 12/2803

OTHER PUBLICATIONS

Bos et al., Remote Management and Secure Application Development for Pervasive Home Systems Using JASON, © 2007 IEEE.*

(Continued)

*Primary Examiner* — Jeffrey Pwu
*Assistant Examiner* — Baotram Tran
(74) *Attorney, Agent, or Firm* — Austin Rapp & Hardman

(57) ABSTRACT

A method for providing secure remote access by a controller is described. The method includes sending one or more endpoint requests. The method also includes receiving authentication service endpoint information and connection service endpoint information. The method further includes requesting authentication based on the authentication service endpoint information. Requesting authentication includes requesting license validation. The method also includes sending one or more registration messages based on the connection service endpoint information. The method further includes receiving a session request. The method additionally includes determining controller candidate link information. The method also includes sending the controller candidate link information. The method further includes receiving an automation message based on the controller candidate link information.

8 Claims, 9 Drawing Sheets

(56) References Cited

U.S. PATENT DOCUMENTS

| | | | | |
|---|---|---|---|---|
| 2007/0180491 | A1* | 8/2007 | Mevissen | H04L 63/10 726/2 |
| 2008/0075250 | A1* | 3/2008 | Kent | H04M 15/00 379/133 |
| 2008/0209034 | A1* | 8/2008 | Shin | H04L 12/2807 709/224 |
| 2009/0124271 | A1* | 5/2009 | Roundtree | H04M 1/72552 455/466 |
| 2009/0254971 | A1* | 10/2009 | Herz | G06Q 10/10 726/1 |
| 2010/0088236 | A1* | 4/2010 | Karabulut | G06F 21/10 705/59 |
| 2010/0217837 | A1* | 8/2010 | Ansari | G06Q 30/04 709/218 |
| 2011/0032072 | A1* | 2/2011 | Han | H04L 12/2827 340/5.1 |
| 2011/0105041 | A1* | 5/2011 | Maruyama | G08C 17/02 455/66.1 |
| 2011/0106918 | A1* | 5/2011 | Lakamp | G06F 17/30029 709/219 |
| 2011/0138058 | A1* | 6/2011 | Ishida | H04L 12/4633 709/227 |
| 2011/0145340 | A1* | 6/2011 | Sriraghavan | H04L 51/18 709/206 |
| 2011/0170696 | A1* | 7/2011 | Yeap | G06F 21/335 380/278 |
| 2011/0202411 | A1* | 8/2011 | Nakai | G06Q 30/02 705/14.73 |
| 2011/0222427 | A1* | 9/2011 | Hjelm | H04W 4/08 370/252 |
| 2011/0230236 | A1* | 9/2011 | Tsai | H04L 12/2818 455/557 |
| 2012/0054102 | A1* | 3/2012 | Schwartz | G06Q 20/322 705/44 |
| 2012/0054274 | A1* | 3/2012 | Schwimer | H04L 67/306 709/203 |
| 2012/0054842 | A1* | 3/2012 | Urios Rodriguez | G06F 21/32 726/6 |
| 2012/0082150 | A1* | 4/2012 | Ozawa | H04L 12/2836 370/338 |
| 2012/0083937 | A1* | 4/2012 | Kong | G06Q 50/06 700/295 |
| 2013/0067536 | A1* | 3/2013 | Takahashi | H04L 12/2803 726/3 |
| 2013/0073617 | A1* | 3/2013 | Ishizuka | H04W 12/06 709/203 |
| 2013/0145030 | A1* | 6/2013 | Ohira | H04M 1/72533 709/225 |
| 2013/0155948 | A1* | 6/2013 | Pinheiro | H04W 4/005 370/328 |
| 2013/0335592 | A1* | 12/2013 | Yamada | H04B 10/11 348/229.1 |

OTHER PUBLICATIONS

Chen et al., S2A: Secure Smart Houshold Appliances, © 2012 CODASPY, San Antonio, Texas.*

Dimov et al., Customizing Model-View-Controller design pattern for Web Controlled Household Appliances and Devices, $43^{rd}$ ACM Southeast Conference © 2005.*

Houston et al., An Internet Accessible Remote Controlled Home Automation System, © 1997 ACM.*

Kistler etal., UPnP in Integrated Home- and Buliding Networks, © 2008 IEEE, Lucerne University, Switerland.*

Pishva et al., A Product Based Security Model for Smart Home Appliances, © 2006 IEEE, Japan.*

Siekkinen et al., hBox—Connecting Homes, © 2009 IEEE, Helsinki University, Finland.*

Ventylees et al., Implementation of Pervasive Computing Based High-Secure Smart Home System, © 2012, IEEE, Kings College of Engg, Punalkulam.*

Wei et al., Wireless Sensor Networks for In-Home Healthcare: Issues, Trend and Prospect, © 2011 IEEE, Shenyang Jianzhu University, China.*

Helen M. Wood, The use of passwords for controlling access to remote computer systems and services, National Computer Conference, 1997.*

Rosenberg, et. al., "RFC-3261, SIP: Session Initiation Protocol," Internet Engineering Task Force, Jun. 2002.

Handley, et al., "RFC-4566, SDP: Session Description Protocol," Internet Engineering Task Force, Jul. 2006.

* cited by examiner

DEVICES FOR PROVIDING SECURE REMOTE ACCESS

TECHNICAL FIELD

The present disclosure relates generally to electronic devices. More specifically, the present disclosure relates to devices for providing secure remote access.

BACKGROUND

In recent years, the price of electronic devices has decreased dramatically. In addition, the types of electronic devices that can be purchased have continued to increase. For example, DVD players, large screen TVs, multi-carousel CD and DVD players, MP3 players, video game consoles and similar consumer electronic items have become more widely available while continuing to drop in price.

The decreasing prices and increasing types of electronic components have packed today's homes and businesses with modern conveniences. Typical homes and businesses now include more electronic devices than ever before. While these electronic devices may provide convenience and entertainment, many also require control. Moreover, these electronic devices consume electrical power and may consume other resources. The ever-increasing cost of resources, such as electricity, may be a concern.

Some electronic devices communicate with other electronic devices over a network. However, some difficulties arise in the context of network communications. For example, security and ease of setup and use may be problematic. As illustrated by this discussion, devices that improve communication security and ease of setup and use may be beneficial.

BRIEF SUMMARY OF THE INVENTION

Figure 1:
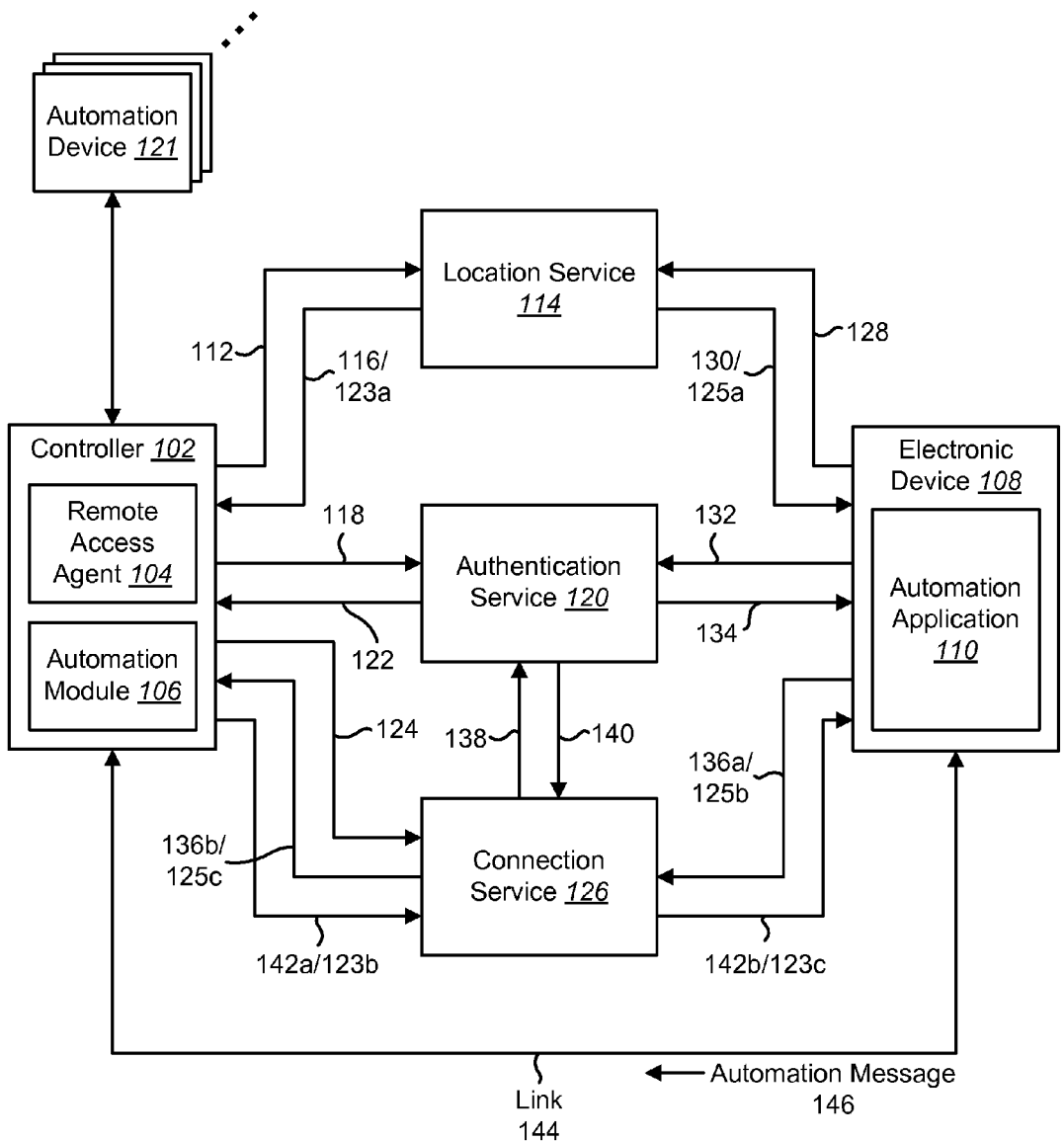
FIG. 1 is a block diagram illustrating one configuration of a controller and an electronic device in which systems and methods for providing secure remote access may be implemented.

A method for providing secure remote access by a controller is described. The method includes sending one or more endpoint requests. The method also includes receiving authentication service endpoint information and connection service endpoint information. The method further includes requesting authentication based on the authentication service endpoint information. Requesting authentication includes requesting license validation. The method also includes sending one or more registration messages based on the connection service endpoint information. The method further includes receiving a session request. The method additionally includes determining controller candidate link information. The method also includes sending the controller candidate link information. The method further includes receiving an automation message based on the controller candidate link information.

Receiving the automation message may include receiving the automation message via at least one of a relay link and a peer-to-peer link. The controller candidate link information may include an internet protocol (IP) address and a port.

The method may also include receiving a controller session token. Additionally, receiving the session request may be based on the controller session token.

A method for providing secure remote access by an electronic device is also disclosed. The method includes sending one or more endpoint requests. The method also includes receiving authentication service endpoint information and connection service endpoint information. The method further includes requesting authentication based on the authentication service endpoint information. The method also includes sending a session request based on the connection service endpoint information. The method further includes receiving controller candidate link information. The method additionally includes sending an automation message based on the controller candidate link information.

A controller that is configured for providing secure remote access is also disclosed. The controller includes a processor, memory in electronic communication with the processor and instructions stored in the memory. The controller sends one or more endpoint requests. The controller receives authentication service endpoint information and connection service endpoint information. The controller requests authentication based on the authentication service endpoint information. Requesting authentication includes requesting license validation. The controller sends one or more registration messages based on the connection service endpoint information. The controller receives a session request. The controller determines controller candidate link information. The controller sends the controller candidate link information. The controller also receives an automation message based on the controller candidate link information.

An electronic device that is configured for providing secure remote access is also disclosed. The electronic device includes a processor, memory in electronic communication with the processor and instructions stored in the memory. The electronic device sends one or more endpoint requests. The electronic device receives authentication service endpoint information and connection service endpoint information. The electronic device requests authentication based on the authentication service endpoint information. The electronic device sends a session request based on the connection service endpoint information. The electronic device receives controller candidate link information. The electronic device also sends an automation message based on the controller candidate link information.

DETAILED DESCRIPTION

Control systems may be used to manage and automate lighting, music, video, security and other control systems in a premises (e.g., homes, businesses and residences, etc.). Secure remote access for control systems may provide an end-user the ability to easily access a control system from an electronic device (e.g., personal computers and mobile devices) from outside the premises while preventing unauthorized access to those same control systems.

There is a need for secure remote access to control systems to serve a large and growing community of end-users. The end-users may be geographically separated from the one or more controllers that they want to access. In addition, a communications mechanism may need to securely negotiate through end-user network security (e.g., firewalls) without end-user configuration.

Remote access to control systems has traditionally been accomplished using virtual private network (VPN) connections, port forwarding, static internet protocol (IP) addresses and/or dynamic domain name system (DDNS). These approaches are problematic. For example, these approaches may require providing an installer access to the end-user's home to configure the home's router. Additionally, the approach involves opening ports on the end-user's router, which introduces security risks to the home owner.

The systems and methods disclosed herein may be used to provide secure remote access to a controller. When the controller is installed, it may be given credentials that may be used for remote access. Upon controller startup, a remote access agent on the controller may use a communication network (e.g., the Internet) to reach a location service, which may provide the controller the ability to discover appropriate endpoints for various services. The controller may use the location service information (e.g., the endpoint information) to contact an authentication service in order to be authenticated on the network. In response to an authentication request, the controller may receive a controller session token from the authentication service. The controller session token may be used to register the controller on a connection service.

When a remote user attempts to connect to the controller using an electronic device, the electronic device may use a communication infrastructure (e.g., cellular phone network, Internet, etc.) to reach the location service, which may provide endpoint information for various services. The electronic device may then request authentication and receive a device session token from the authentication service. The electronic device may then connect to the connection service, which may notify the controller about an in-bound session request.

A remote access agent of the controller may receive the session request and may negotiate a link between the electronic device and the controller. The session may default to a relay service if a peer-to-peer link cannot be established directly.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of a controller 102 and an electronic device 108 in which systems and methods for providing secure remote access may be implemented. Examples of an electronic device 108 that may utilize the systems and methods disclosed herein include desktop computers, laptop computers, tablet devices, netbooks, cellular phones, smart phones, Personal Digital Assistants (PDAs), etc. For example, an end-user may desire to connect to a home automation system from a remote location with an electronic device 108. Through the systems and methods disclosed herein, the electronic device 108 may securely access the controller 102 from a remote location.

The controller 102 may include a remote access agent 104 and an automation module 106. As used herein, the term "module" may denote an element or entity that may be implemented in software, hardware (e.g., circuitry), firmware or any combination thereof. The remote access agent 104 may facilitate secure remote access to the controller 102 as described below. The automation module 106 may perform automation tasks (e.g., send and/or receive control messages to/from controllable electrical equipment). For example, the automation module 106 may control one or more automation devices 121 (e.g., appliances, other electronic devices, etc.).

As used herein, the term "automation" may refer to controlling a device (by means of a controller 102, for instance). For example, in the context of home automation, one or more controllers 102 may control one or more automation devices 121, which may perform an automation task. Examples of automation tasks include adjusting lighting, operating and monitoring security systems, controlling heating and air conditioning, scheduling and operating water sprinkling, adjusting window coverings, controlling entertainment devices and controlling food preparation appliances, etc. Examples of the one or more automation devices 121 include lights and/or lighting systems, thermostats, audio systems, security cameras, web cameras, sprinkling systems, security systems, televisions, game consoles, computers, etc. In some configurations, the controller 102 and the automation devices 121 may comprise electronic devices in electronic communication over a network.

In one configuration, a controller 102 may issue one or more control messages to the automation device(s) 121. Upon receiving the one or more control messages, each of the automation devices 121 may perform an automation task. Additionally, the control message may provide instructions for one or more automation tasks to be performed by the automation devices 121 at the current time and/or at a later time. The automation devices 121 may further include programming functionality, which may enable the automation devices 121 to store and execute data and instructions.

Additionally or alternatively, the automation device 121 may send one or more messages to the controller 102. For example, the automation device 121 may send a response message to the controller 102. In some configurations and/or instances, the response message may provide data and/or indicate the status of the automation device 121. The response message may be issued upon receipt of a control message. Additionally or alternatively, the response message may be issued after completion of an automation task. The automation device 121 may also periodically and/or independently issue one or more response messages (e.g., to inform the controller 102 of the status of the automation device 121).

The controller 102, the electronic device 108 and/or the automation device(s) 121 may include communication functionality that may enable each to communicate over a network. Examples of the network may include local area networks (LANs), storage area networks (SANs), metropolitan area networks (MANs), wide area networks (WANs) or combinations thereof (e.g., the Internet). In some configurations, the controller 102 and the automation devices 121 may not reside at the same physical location, within the same network segment, or even within the same network. In other configurations, the controller 102 and the automation devices 121 may be located at the same physical location (e.g., within a home), within the same network segment, or even within the same network. Thus, for example, some devices (e.g., the controller 102 and the automation device(s) 121) may reside at the same physical location (e.g., within a home, business, building, plot, etc.), but other devices (e.g., the electronic device 108) may not reside in the same physical location.

A variety of different network configurations and/or protocols may be used by the controller 102, the electronic device 108 and/or the automation device(s) 121, including Ethernet, transmission control protocol/Internet protocol (TCP/IP), user datagram protocol/IP (UDP/IP), Institute of Electrical and Electronics Engineers (IEEE) 802.11, IEEE 802.16, session initiation protocol (SIP), Bluetooth, asynchronous transfer mode (ATM), fiber distributed data interface (FDDI), token ring, wireless networks (e.g., wireless telephone/data network) and/or proprietary formulas and so forth, including combinations thereof.

The controller 102 may communicate with one or more services. One example of a service may be a web service. A service may, for instance, comprise software that enables interoperation over a network. For example, a service may interact with the controller 102 and/or electronic device 108 over a network. One or more services may be implemented on one or more servers that may be in communication with the controller 102 and/or electronic device 108 over a network. Furthermore, a service may provide one or more functions to the controller 102 and/or electronic device 108. Examples of services may include a location service 114, an authentication service 120 and a connection service 126. The controller 102 and/or electronic device 108 may communicate with a service over a network using one or more communication protocols (e.g., TCP/IP, hypertext transfer protocol (HTTP), SIP, etc.).

The controller 102 may communicate with the location service 114 to obtain endpoint information for one or more services. The location service 114 may store, organize and provide a centralized directory for clients (e.g., the controller 102 and/or the electronic device 108) to look up (e.g., receive) endpoint information based on the one or more services provided by that endpoint. Endpoint information may include, for example, IP addresses, port numbers, host names and/or domain names associated with an endpoint, protocols and address types which may enable a client to establish a communication link with the endpoint. Additionally, the location service 114 may include listings of unauthenticated and authenticated service endpoints, which may allow limiting (by the location service 114, for example) exposure of the services only to authenticated clients. For example, the location service 114 may allow a client to lookup service endpoints based on a set of rules in order for the location service 114 to return endpoints that are appropriate for the client to use. For instance, these rules may include whether or not the client is authenticated and authorized to use one or more services, multitenant-specific services, the type of client making the endpoint request and/or the protocol used to access services (e.g., Representational State Transfer (REST)ful versus Simple Object Access Protocol (SOAP), etc.).

The location service 114 may be the main entry point for clients to discover available services and receive endpoint information to communicate with those services. For example, an unauthenticated client calling (e.g., communicating with) the location service 114 may only receive authentication service endpoint information (initially, for instance). Once the client has successfully authenticated, a second call to the location service 114 may return a list of available services (e.g., the connection service 126, an account service, a relay service, a Traversal Using Relays around Network Address Translation (NAT) (TURN) server, etc.) with which the client may communicate.

The controller 102 may connect to the location service 114 with an IP address for the location service 114 that may be preconfigured on the controller 102 during installation. Alternatively, the controller 102 may be programmed to search the network for an updated location service IP address.

Upon connecting to the location service 114, the controller 102 may send one or more endpoint requests 112 to the location service 114. The location service 114 may send one or more endpoint responses 116 to the controller 102. In one configuration, the endpoint response 116 may include a single authentication service endpoint, connection service endpoint and relay service endpoint. Alternatively, the location service 114 may send multiple endpoint responses 116, where each response may include endpoint information for one or more endpoints (e.g., an authentication service endpoint, a connection service endpoint and/or a relay service endpoint). Additionally or alternatively, the endpoint response 116 may include endpoint information for multiple endpoints for each service that the controller 102 may select from while attempting to connect to the services. In yet another configuration, the endpoint response 116 may include controller candidate link information 123a, which may include IP addresses, port numbers, protocols and address types (e.g., host, relay, server reflexive, etc.) with which the electronic device 108 may attempt to establish a link 144 with the controller 102.

The controller 102 may contact an authentication service 120 to be authenticated on the network. The authentication service 120 may comprise a service with which the controller 102 may communicate over the network using a communication protocol. The authentication service 120 may verify that the controller 102 has authorization to register its location with a connection service 126. For example, the controller 102 may include credentials (e.g., one or more digital certificates and/or one or more application keys) that may be verified by the authentication service 120. In one configuration, the credentials that the controller 102 may send to the authentication service 120 in the authentication request 118 may be an X.509 digital certificate and an application key. The X.509 digital certificate may be issued to the controller 102 when the controller 102 is first installed or registered (at the end-user's home, for instance). The controller 102 may send an authentication request 118 to the authentication service 120 designated by the authentication service endpoint received from the location service 114. The authentication request 118 may include the controller credentials.

Upon receiving the authentication request 118, the authentication service 120 may authenticate the controller 102. Authentication by the authentication service 120 may include authenticating the controller credentials. For example, the authentication service 120 may verify that the digital certificate of the controller 102 is valid, not expired and/or not revoked. The authentication service 120 may additionally check the controller credentials to verify that the controller 102 may have a valid license.

In some implementations, requesting authentication (via the authentication request 118) may comprise requesting license validation. In one configuration, the controller 102 may send a digital certificate (e.g., an X.509 digital certificate) and an application key to authentication service 120 in the authentication request 118. The authentication service 120 may validate that the digital certificate is valid, has not expired and is not revoked. If the digital certificate is successfully validated, the authentication service 120 may determine if the application (e.g., the remote access agent 104 and/or the automation module 106) associated with application key requires one or more licenses. If so, the authentication service 120 may verify whether the account associated with controller 102 has the required license(s), whether the license(s) have not expired or been revoked and/or whether the license(s) have not exceeded their limits. In some configurations, the controller 102 may only be authenticated after a successful certificate validation and license check. Authentication by the authentication service 120 may additionally or alternatively include determining whether the controller 102 belongs to a valid account and determining whether the controller 102 is authorized to register on the network.

If the controller 102 is successfully authenticated, the authentication service 120 may send the controller 102 a controller session token 122. The controller session token 122 may be a unique piece of data that may identify the controller 102 in network communication.

The controller 102 may contact a connection service 126 in order to register the location of the controller 102. The connection service 126 may comprise a service with which the controller 102 may communicate over the network using a communication protocol. The connection service 126 may negotiate a link 144 between the controller 102 and the electronic device 108.

In one configuration, the connection service 126 communicates with clients (e.g., the controller 102 and the electronic device 108) using the SIP protocol. SIP is the acronym for Session Initiation Protocol (Request For Comments (RFC)-3261), which is an Internet Engineering Task Force (IETF) protocol (for initiating communication sessions for the client (e.g., electronic device 108) to the control system (e.g., controller 102), for example). SIP is an application-layer control (signaling) protocol for creating, modifying and terminating sessions with one or more participants. Parameters (e.g., port numbers, protocols, etc.) for the SIP communication may be defined and negotiated using the Session Description Protocol (SDP), which may be transported in an SIP packet body. SDP is an acronym for Session Description Protocol (RFC-4566), which may be used to describe the format of endpoint messages. For example, SDP may describe multimedia sessions for the purposes of session announcement, session invitation and other forms of multimedia session initiation. The SIP messages used to create sessions may carry session descriptions that may allow participants to agree on a set of compatible media types. These session descriptions may be formatted using SDP. Both of these protocols (SIP and SDP) may be used to set up the final link 144 from the electronic device 108 and the controller 102. The combination of SIP/SDP may facilitate the establishment of a secure link 144 for communicating automation messages 146.

The controller 102 may send a registration message 124 to the connection service 126. The registration message 124 may include the internal and external IP addresses of the controller 102 and the controller secure token 122. After receiving the registration message 124, the connection service 126 may register the location of the controller 102 for future session requests that may be sent by the electronic device 108. Additionally, the connection service 126 may verify the controller secure token 122 before registering the controller 102. In one configuration, the controller 102 periodically resends (e.g., every three minutes) a registration message 124 to the connection service 126 in order to keep the connection to the connection service 126 alive and traceable back to the controller 102. By registering with the connection service 126, the controller 102 may traverse the network address translations (NATs), thereby increasing network security by avoiding port forwarding and VPN connections in order to traverse the NATs.

An electronic device 108 may include an automation application 110. The automation application 110 may include hardware and/or software that may enable communication with the controller 102. For example, the electronic device 108 may comprise a smart phone that includes an automation application 110 as an executable program. The automation application 110 may additionally include an application key that may be used to validate an application. For example, the application key may be hardcoded in the automation application 110 or may be assigned by a service. For instance, a service for identifying applications may be implemented. In some configurations, the electronic device 108 may call the authentication service 120 with a user identification (ID), password and/or application key. The application key may be stored in or by the automation application 110. In some configurations, the application key may be given out-of-band to validate an application (e.g., not an instance of an application). An end-user may run the automation application 110, which may utilize the hardware of the electronic device 108 (e.g., cellular network hardware, wireless network hardware, etc.) to access the network. Another example of the electronic device 108 is a laptop that may access the Internet through a wireless (e.g., Wi-Fi) network connection and on which the automation application 110 may be run.

The electronic device 108 may send one or more endpoint requests 128 to the location service 114. The location service 114 may send one or more endpoint responses 130 to the electronic device 108. As described above, the endpoint response 130 may include the endpoint information for various services that may facilitate secure remote access to the controller 102. For example, one or more endpoint responses 130 may include endpoint information for one or more authorization service endpoints and/or one or more connection service endpoints. Additionally, the one or more endpoint responses 130 may include device candidate link information 125a, which may include IP addresses, port numbers, protocols and descriptions of the type of IP address (e.g., host, relay, server reflexive, etc.) to which the controller 102 may attempt to establish a link 144 with the electronic device 108.

The electronic device 108 may send an authentication request 132 to the authentication service 120 in order to be authenticated on the network. The electronic device 108 may contact the authentication service 120 designated by the authentication service endpoint received from the location service 114. The authentication service 120 may verify the identity of the electronic device 108.

In some implementations, the authentication service 120 may assess or validate credentials (e.g., username, password and/or an application key) sent from the electronic device 108. For example, authentication service 120 may validate that the username and password are valid. If the username and password are successfully validated, the authentication service 120 may determine if the application (e.g., the automation module 110) associated with application key requires one or more licenses. If so, the authentication service 120 may verify whether the account associated with the end-user has the required license(s), whether the license(s) have not expired or been revoked and/or whether the license(s) have not exceeded their limits. In some configurations, the controller 102 (e.g., a user) for an application may only be authenticated after a successful certificate validation and license check. The authentication service 120 may also determine whether the electronic device 108 has authorization to access the controller 102. Once the authentication service 120 has verified the identity of (e.g., authenticated) the electronic device 108, the authentication service 120 may send a device session token 134 to the electronic device 108. As described above, the device session token 134 may identify a communication session and/or the electronic device 108 for network communication.

The electronic device 108 may contact a connection service 126 in order to negotiate a link 144 to the controller 102. The electronic device 108 may send a session request 136a to the connection service 126. The session request 136a may identify the controller 102 that the electronic device 108 is attempting to access. The session request 136a may additionally include the device session token 134 and device candidate link information 125b. For example, the device candidate link information 125b included with the session request 136a may include multiple IP addresses of the electronic device 108. For instance, these IP addresses may comprise private IP addresses (e.g., 192.168.x.x or 10.x.x.x based IP addresses) and a public IP address of the network provider.

Upon receiving the session request 136a, the connection service 126 may verify (e.g., validate) that the electronic device 108 is authorized to access the controller 102. The connection service 126 may send a verification request 138 to the authentication service 120. The verification request 138 may include information identifying both the controller 102 and the electronic device 108. For example, the verification request 138 may include the controller session token 122 and the device session token 134. If the authentication service 120 verifies that the electronic device 108 is authorized to access the controller 102, the authentication service 120 may send a verification message 140 back to the connection service 126. Upon receiving the verification message 140, the connection service 126 may send the session request 136b to the controller 102. The session request 136b may additionally include the device session token 134 and device candidate link information 125c. The connection service 126 may determine the location of the controller 102 based on the IP address designated by the registration message 124 sent by the controller 102.

Upon receiving the session request 136b, the controller 102 may determine controller candidate link information 123b based on the type of link 144 that may be established with the electronic device 108. In one configuration, the controller 102 may receive controller candidate link information 123a in the endpoint response 116 from the location service 114. In another configuration, the controller 102 may contact the location service 114 after receiving the session request 136b in order to obtain the controller candidate link information 123a. In some configurations, the controller candidate link information 123a, 123b may include one or more of IP addresses, port numbers, protocols and address type (e.g., host, relay, server reflexive, etc.) to which the electronic device 108 may attempt to establish a link with the controller 102.

In one configuration, the controller 102 may include its own information in the controller candidate link information 123b in order to attempt to establish a direct link 144 (e.g., peer-to-peer link or communication) with the electronic device 108. With a direct link 144, the controller 102 and the electronic device 108 may establish a link 144 without an intermediary (e.g., relay) service linking the controller 102 and the electronic device 108. For example, a peer-to-peer link 144 may be established based on a set of protocols that determines a best available way to establish a direct connection 144 without the need for a relay. A direct link 144 may be negotiated via the connection service 126 between the controller 102 system and the electronic device 108. The connection service 126 may allow both the controller 102 and the electronic device 108 to discover and securely relay their externally accessible IP address and ports to each other so that they may attempt to establish the direct link 144. For example, the controller 102 may receive the IP address for the electronic device 108 in the session request 136b. In order to negotiate a direct link 144, the controller 102 may include its own IP addresses (e.g., internal and external), port numbers, protocols and address type (e.g., host, relay, server reflexive, etc.) in the controller candidate link information 123b.

In another configuration, the controller 102 may allocate a relay link 144 with one or more relay services and include the connection information of the one or more relay (e.g., TURN) services in the controller candidate link information 123b. For example, the controller 102 may initiate a relay link with one or more relay services, as described in more detail below in FIG. 6. The one or more relay services may send to the controller 102 the IP address(es), port number(s), protocol(s) and address types for the one or more relay services. The controller 102 may include the IP address(es), port number(s), protocol(s) and address types for the one or more relay services in the controller candidate link information 123b. Additionally or alternatively, the relay services may send to the controller 102 a host name and domain name to which both the controller 102 and the electronic device 108 may connect.

Upon determining the controller candidate link information 123b, the controller 102 may send a session response 142a to the connection service 126. The session response 142a may include the controller candidate link information 123b. Upon receiving the session response 142a, the connection service 126 may send the session response 142b to the electronic device 108.

Upon receiving the session response 142b, the electronic device 108 may attempt to establish the link 144 to the controller 102 based on the controller candidate link information 123c and the device candidate link information 125b. In one configuration, the electronic device 108 and the controller 102 may attempt to negotiate a direct link 144. The electronic device 108 may contact the controller 102 based on the controller's 102 connection information (e.g., IP addresses and port numbers) included in the controller candidate link information 123c. Additionally, the controller 102 may contact the electronic device 108 based on the electronic device's 108 connection information (e.g., IP addresses and port numbers) included in the device candidate link information 125c. In some configurations, if the controller 102 and the electronic device 108 may communicate directly with each other, the direct link 144 (e.g., peer-to-peer connection) is established. Once the direct link 144 may be established, the electronic device 108 may access the controller 102 (e.g., send an automation message 146).

In another configuration, the controller 102 and the electronic device 108 may attempt to establish a relay link 144 based on the IP address(es) and port number(s) of the one or more relay services that may be included in the controller candidate link information 123c. The relay link 144 may be established as described below in FIG. 6.

In yet another configuration, the controller 102 and the electronic device 108 may first attempt to establish a direct link 144 using the other's candidate link information (e.g., IP address(es), port(s), protocol(s) and/or address type). If the controller 102 and the electronic device 108 are unable to establish a direct link 144 and/or the direct link 144 is unreliable, the controller 102 and the electronic device 108 may negotiate or attempt to establish a relay link 144 based on the connection information for the one or more relay services included in the controller candidate link information 123b, 123c (or based on the relay candidate allocated on a relay service by the controller 102, for example).

Upon establishing the link 144 between the electronic device 108 and the controller 102, the electronic device 108 may send an automation message 146 to the controller 102. The automation message 146 may include instructions that may be implemented by the controller 102. For example, the automation message 146 may instruct the controller 102 to initiate one or more automation tasks (e.g., change the temperature of the home, turn off the lights, arm a security system, etc.) Additionally or alternatively, the automation message 146 may request information from the controller 102 (e.g., security system status, security camera feed, current thermostat setting, energy consumption, lighting system status, sprinkling system schedule, etc.). It will be appreciated that messages may also be sent from the controller 102 to the electronic device 108 across the link 144. For example, the electronic device 108 may receive messages from the controller 102 in response to the automation message 146.

In some configurations, upon establishing the link 144 between the controller 102 and the electronic device 108, the connections with the other services may be terminated. For example, after the controller 102 and the electronic device 108 have established the link 144, the connection service 126 may terminate its connection with the electronic device 108. Therefore, terminating obsolete connections may reduce network congestion and improve the scalability of the system.

Figure 2:
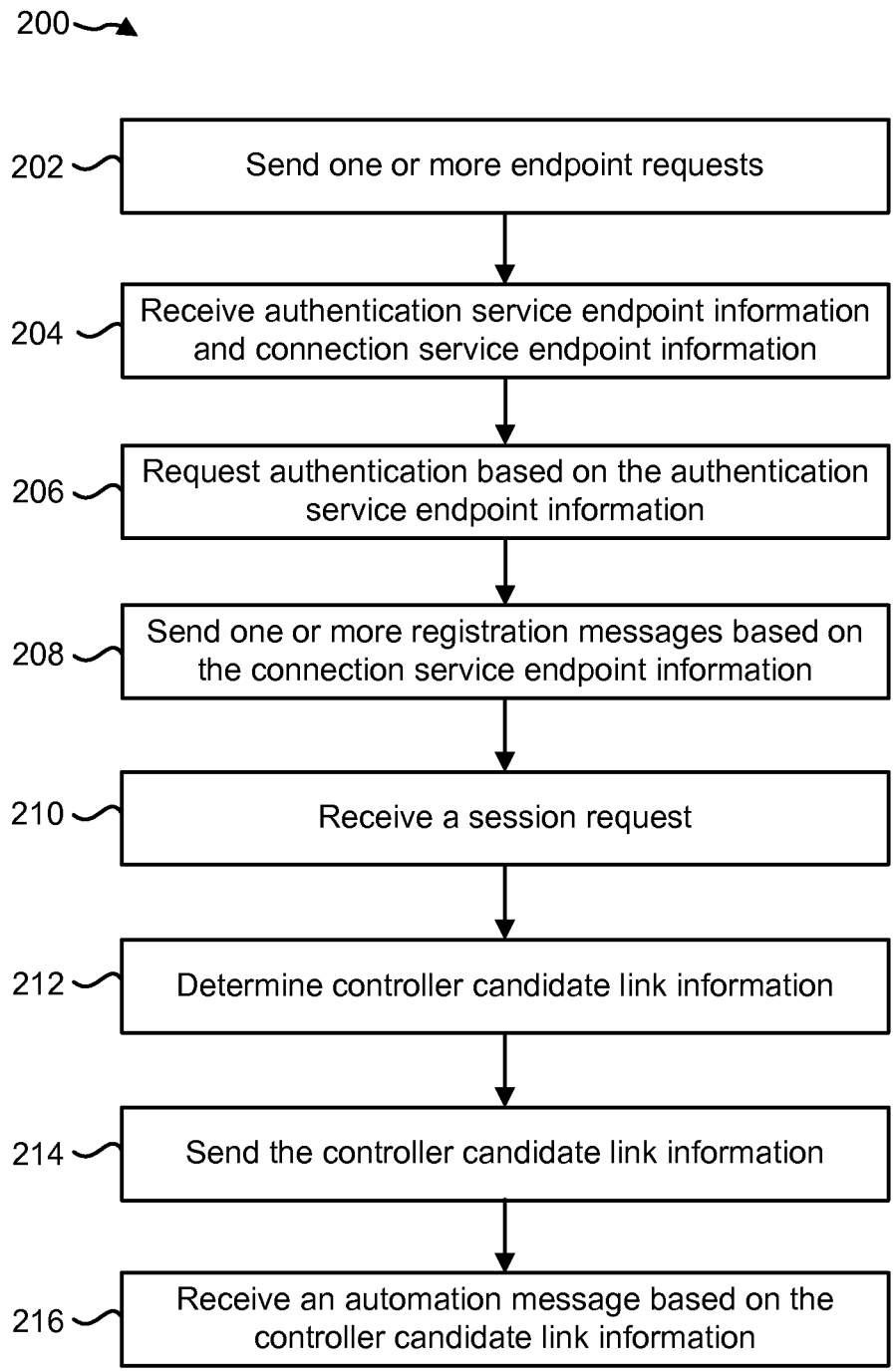
FIG. 2 is a flow diagram illustrating one configuration of a method for providing secure remote access by a controller.

FIG. 2 is a flow diagram illustrating one configuration of a method 200 for providing secure remote access by a controller 102. A controller 102 may send 202 one or more endpoint requests 112. For example, the controller 102 may send 202 one or more endpoint requests 112 to a location service 114. The location service 114 may include the endpoint information for other services that may facilitate secure remote access to the controller 102. Endpoint information may include, for example, IP addresses and port numbers for the endpoints of the other services. For instance, the location service 114 may include endpoint information for an authentication service 120 and a connection service 126. In one configuration, the controller 102 may send 202 one endpoint request 112 in order to obtain endpoint information for multiple endpoints from the location service 114. Alternatively, the controller 102 may send 202 multiple endpoint requests 112 to the location service 114 in order to request endpoint information for service endpoints at different times.

The controller 102 may receive 204 authentication service endpoint information and connection service endpoint information. For example, the controller 102 may receive 204 one or more endpoint responses 116 that may include authentication service endpoint information and connection service endpoint information. In one configuration, the controller 102 may receive 204 the authentication service endpoint information and the connection service endpoint information in a single message sent from the location service 114. Alternatively, the controller 102 may receive the authentication service endpoint information and the connection service endpoint information in separate messages sent from the location service 114. In yet another configuration, the endpoint response 116 may include controller candidate link information 123*a*, which may include IP addresses, port numbers, protocols and address types (e.g., host, relay, server reflexive, etc.) to which the electronic device 108 may attempt to establish a link 144 with the controller 102.

The controller 102 may request 206 authentication based on the authentication service endpoint information. For example, the controller 102 may send an authentication request 118 to an authentication service 120 that may be designated by the authentication service endpoint information received from the location service 114. In one configuration, the authentication request 118 may include credentials (e.g., one or more digital certificates and/or one or more application keys) that may be included with the controller 102. The authentication service 120 may assess the controller credentials and validate the controller 102. Additionally or alternatively, the authentication service 120 may check the controller credentials included in the authentication request 118 to verify that the controller 102 may have a valid license. If the controller credentials are successfully authenticated and/or the license is validated, the authentication service 120 may send a controller session token 122 to the controller 102, which the controller 102 may distribute in order to establish secure communication sessions on the network.

The controller 102 may send 208 one or more registration messages 124 based on the connection service endpoint information. For example, the controller 102 may send 208 a registration message 124 to a connection service 126 designated by the connection service endpoint information received from the location service 114. The registration message 124 may include the internal and external IP addresses of the controller 102 and the controller secure token 122. The connection service 126 may authenticate the controller secure token 122 in order to determine if the controller 102 is authorized to register with the connection service 126. If the controller 102 is authorized to register, the connection service 126 may register the location of the controller 102. In one configuration, the controller 102 may send 208 a single registration message 124. Alternatively, the controller 102 may send 208 multiple registration messages 124. For instance, the controller 102 may send 208 a registration message 124 every three minutes in order to maintain its registration with the connection service 126.

The controller 102 may receive 210 a session request 136*b*. For example, the controller 102 may receive 210 a session request 136*b* that is forwarded from the connection service 126 with which the controller 102 is registered. The session request 136*b* may originate from an electronic device 108. After the connection service 126 verifies that the electronic device 108 is authorized to access the controller 102, the connection service 126 may send the session request 136*b* to the registered location of the controller 102. The session request 136*b* may indicate that the electronic device 108 would like to establish a link 144 with the controller 102. Furthermore, the session request 136*b* may include the device candidate link information 125*c* and a device session token 134.

The controller 102 may determine 212 controller candidate link information 123*b*. For example, the controller 102 may determine 212 controller candidate link information 123*b* based on the type of link 144 that may be established to the electronic device 108. For instance, if a direct link 144 may be established, the controller candidate link information 123*b* may include the IP addresses (e.g., internal and external) and port number of the controller 102. Additionally or alternatively, the controller candidate link information 123*b* may include an IP address and a port number for a relay service. In some configurations, determining 212 the controller candidate link information 123*b* may include receiving connection information from a relay service, location service 114 and/or a connection service 126. Additionally or alternatively, determining 212 the controller candidate link information 123*b* may include obtaining and/or setting controller candidate link information 123*b* (e.g., IP address and/or ports, protocols, address types, etc.) of the controller 102. In some configurations, determining 212 the controller candidate link information 123*b* may include compiling information. For example, the controller 102 may receive controller candidate link information 123*a* included in the endpoint response 116 received from a location service 114. The controller 102 may then add to the controller candidate link information 123*a* in response to the session request 136*b*. For instance, the controller 102 may include its own IP address(es) and port(s) and one or more relay service IP addresses and ports in the updated controller candidate link information 123*b*.

The controller 102 may send 214 the controller candidate link information 123*b*. For example, the controller 102 may include the controller candidate link information 123*b* in a session response 142*a* sent 214 to the connection service 126 in order for the connection service 126 to forward the session response 142*b* and controller candidate link information 123*c* to the electronic device 108.

In one configuration, when the electronic device 108 receives the controller candidate link information 123*c*, the controller 102 and the electronic device 108 may establish the link 144 based on the controller candidate link information 123*c* and the device candidate link information 125*b*. Upon establishing the link 144 to the controller 102, the electronic device 108 may send an automation message 146.

The controller 102 may receive 216 an automation message 146 based on the controller candidate link information 123*b*, 123*c*. For example, the controller 102 may receive 216 the automation message 146 directly from the electronic device 108 if the controller 102 and the electronic device 108 establish a direct link 144 based on the IP addresses and port numbers of the controller 102 included in the controller candidate link information 123*b*, 123*c*. Alternatively, the controller 102 may receive 216 the automation message 146 from a relay service if the controller candidate link information 123*b*, 123*c* designated a relay service link 144. The automation message 146 may instruct the controller 102 to perform one or more automation tasks. For example, the automation message 146 may allow an end-user to control the controller 102 of a home automation system from a remote location.

Figure 3:
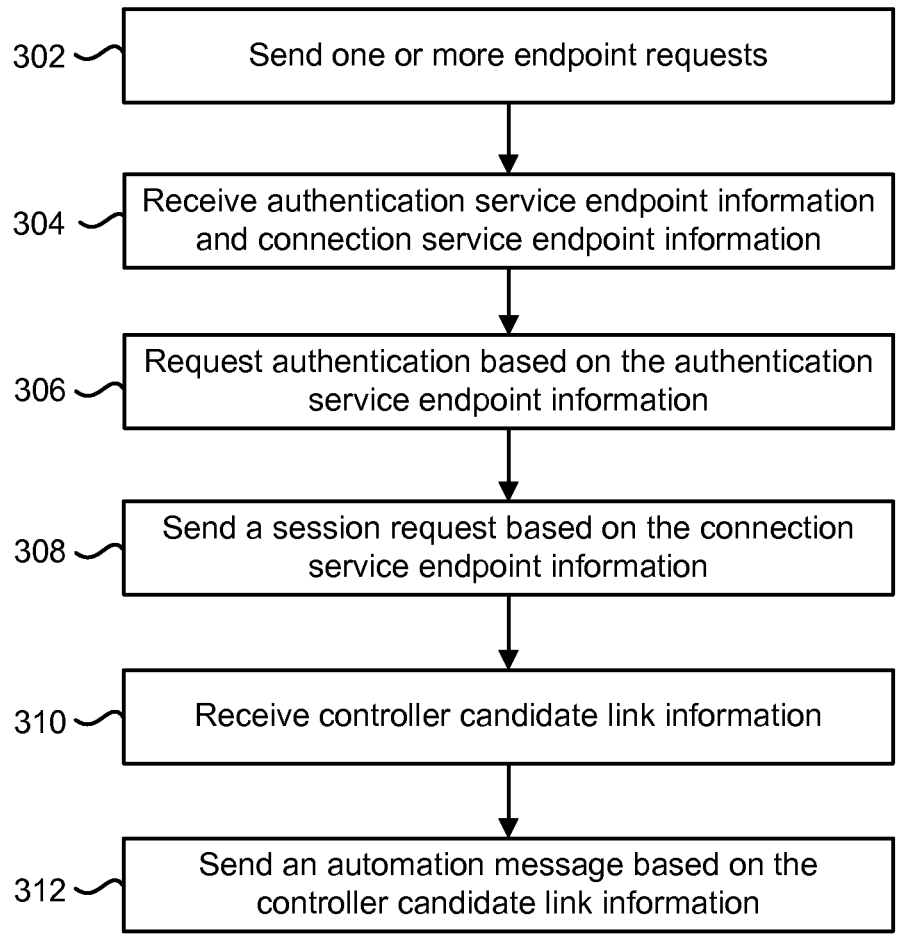
FIG. 3 is a flow diagram illustrating one configuration of a method for providing secure remote access by an electronic device.

FIG. 3 is a flow diagram illustrating one configuration of a method 300 for providing secure remote access by an electronic device 108. An electronic device 108 may send 302 one or more endpoint requests 128. For example, the electronic device 108 may send 302 one or more endpoint requests 128 to a location service 114. The location service 114 may include endpoint information for other services that may facilitate secure remote access to a controller 102 by the electronic device 108. Endpoint information may include, for example, IP addresses and port numbers for the endpoints of the other services. For instance, the location service 114 may include endpoint information for an authentication service 120 and a connection service 126. The electronic device 108 may send 302 a single endpoint request 128 in order to obtain endpoint information for multiple endpoints from the location service 114. Alternatively, the electronic device 108 may send 302 multiple endpoint requests 128 to the location service 114 in order to request endpoint information for service endpoints at different times.

The electronic device 108 may receive 304 authentication service endpoint information and connection service endpoint information. For example, the electronic device 108 may receive 304 one or more endpoint responses 130 that may include authentication service endpoint information and connection service endpoint information. The electronic device 108 may receive 304 the authentication service endpoint information and the connection service endpoint information in a single message sent from the location service 114. Alternatively, the electronic device 108 may receive 304 the authentication service endpoint information and the connection service endpoint information in separate messages sent from the location service 114. In yet another configuration, the endpoint response 130 may include device candidate link information 125*a*, which may include IP addresses, port numbers, protocols and address types (e.g., host, relay, server reflexive, etc.) to which the controller 102 may attempt to establish a link 144 with the electronic device 108.

The electronic device 108 may request 306 authentication based on the authentication service endpoint information. For example, the electronic device 108 may send an authentication request 132 to an authentication service 120 that may be designated by the authentication service endpoint information received from the location service 114. In one configuration, the authentication request 132 may include credentials that may be included with the electronic device 108. The authentication service 120 may assess the electronic device credentials and validate the electronic device 108. In some configurations, the authentication service 120 may check the electronic device credentials included in the authentication request 132 in order to verify that the controller 102 may have a valid license. If the electronic device credentials are successfully authenticated and/or the license is validated, the authentication service 120 may send a device session token 134 to the electronic device 108, which the electronic device 108 may distribute in order to establish secure communication sessions on the network. In some configurations, requesting 306 authentication may include requesting license validation.

The electronic device 108 may send 308 a session request 136*a* based on the connection service endpoint information. For example, the electronic device 108 may send 308 a session request 136*a* to a connection service 126 that may be designated by the connection service endpoint information received from the location service 114. The session request 136*a* may indicate that the electronic device 108 would like to establish a link 144 with the controller 102. Furthermore, the session request 136*a* may include the device candidate link information 125*b* (e.g., the IP addresses, port numbers, protocols and address type of the electronic device 108) and a device session token 134. After the connection service 126 verifies that the electronic device 108 is authorized to access the controller 102, the connection service 126 may send the session request 136*b* to the controller 102.

The electronic device 108 may receive 310 controller candidate link information 123*c*. For example, the electronic device 108 may receive 310 controller candidate link information 123*c* from the connection service 126. In one configuration, the controller 102 may determine the controller candidate link information 123*b*. The controller 102 may determine the controller candidate link information 123*b* as described above in FIG. 2. The controller candidate link information 123*b* may include one or more IP addresses, port number, protocols and address types with which the electronic device 108 may establish the link 144 with the controller 102. The controller 102 may send the controller candidate link information 123*b* to the connection service 126 in order for the connection service 126 to send the controller candidate link information 123*c* to the electronic device 108.

The controller 102 and the electronic device 108 may establish the link 144 based on the controller candidate link information 123*b*, 123*c* and the device candidate link information 125*b*, 125*c*. For example, the controller candidate link information 123*b*, 123*c* may indicate that the electronic device 108 may establish a direct link 144 with the controller 102. Alternatively, the controller candidate link information 123*b*, 123*c* may indicate that the electronic device 108 may establish a relay service link 144 with the controller 102.

The electronic device 108 may send 312 an automation message based on the controller candidate link information 123*b*, 123*c*. For example, the electronic device 108 may send 312 the automation message 146 directly to the controller 102 if the controller 102 and the electronic device 108 establish a direct link 144 based on the IP addresses and port numbers of the controller 102 included in the controller candidate link information 123*b*, 123*c*. Alternatively, the electronic device 108 may send 312 the automation message 146 to a relay service if the controller candidate link information 123*b*, 123*c* designated a relay service link 144. The relay service may then send the automation message 146 to the controller 102. The automation message 146 may instruct the controller 102 to perform one or more automation tasks.

Figure 4:
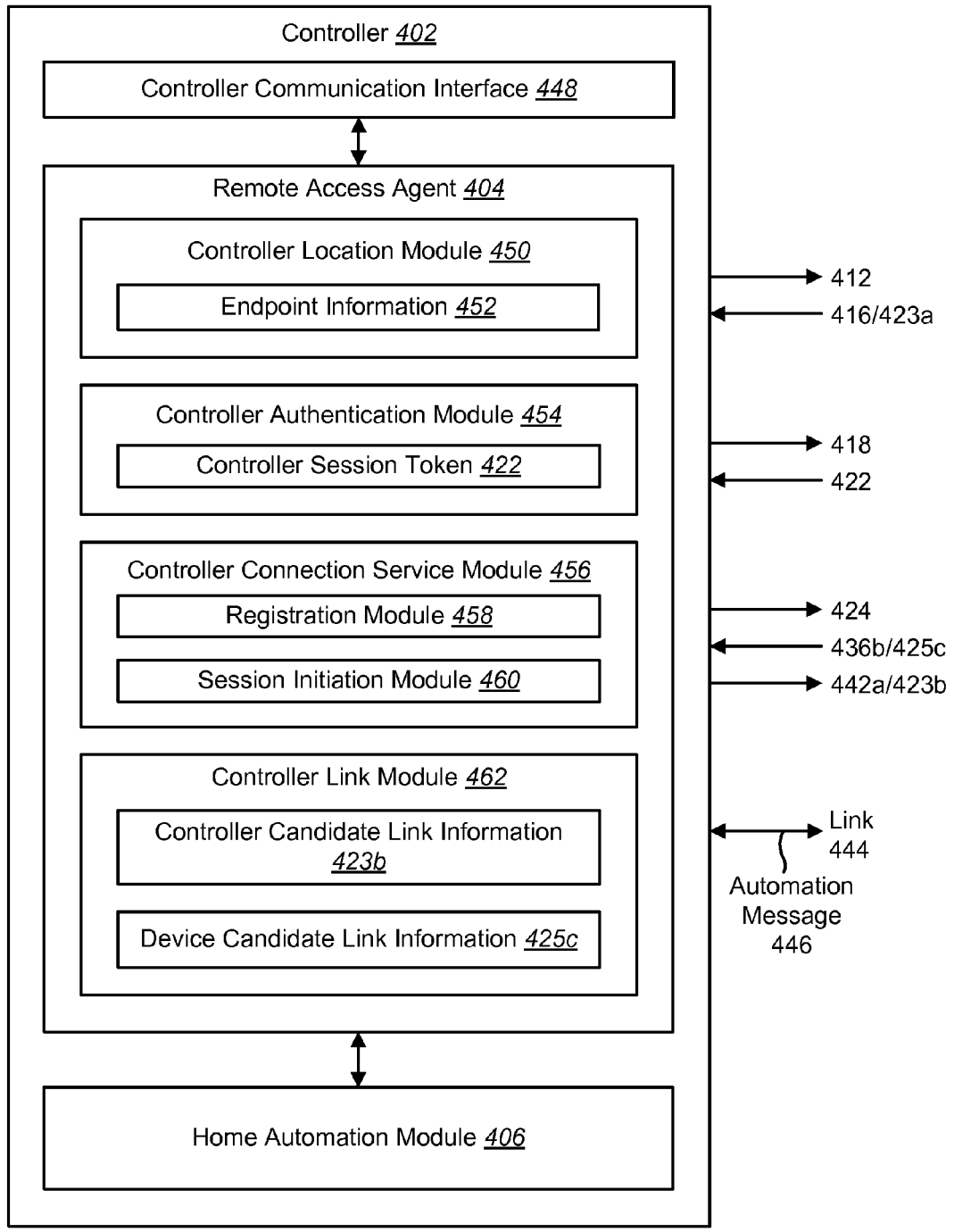
FIG. 4 is a block diagram illustrating one configuration of a controller in which systems and methods for providing secure remote access may be implemented.

FIG. 4 is a block diagram illustrating one configuration of a controller 402 in which systems and methods for providing secure remote access may be implemented. The controller 402 may include one or more controller communication interfaces 448, one or more remote access agents 404 and one or more automation modules 406.

The controller communication interface 448 may comprise one or more components used by the controller 402 to communicate with other electronic devices. For example, the controller communication interface 448 may include a Universal Serial Bus (USB) port, a High-Definition Multimedia Interface (HDMI) port, an infrared (IR) receiver/transmitter and/or an IEEE 1394 port, an antenna port, etc. Additionally or alternatively, the controller communication interface 448 may comprise one or more components used by the controller 402 to communicate with other electronic devices over a network. For example, the controller communication interface 448 may include an Ethernet port, Wi-Fi chip, USB port, wireless modem, etc.

The remote access agent 404 may comprise one or more components used by the controller 402 to establish a link 444 with an electronic device 108 for secure remote access to the controller 402. The remote access agent 404 may include a controller location module 450, a controller authentication module 454, a controller connection service module 456 and a controller link module 462. The remote access agent 404 may send and/or receive messages through the controller communication interface 448.

The controller location module 450 may comprise one or more components that may be used to obtain endpoint information 452 for various services that may facilitate secure remote access to the controller 402. For example, the controller location module 450 may send an endpoint request 412 to a location service 114. The location service 114 may include endpoint information for one or more authorization service endpoints, connection service endpoints and relay service endpoints. The controller 402 may receive an endpoint response 416 from the location service 114. The controller location module 450 may store the endpoint information 452 into memory. In yet another configuration, the endpoint response 416 may include controller candidate link information 423*a*, which may include IP addresses, port numbers, protocols and address types (e.g., host, relay, server reflexive, etc.) to which the electronic device 408 may attempt to establish a link 444 with the controller 402.

The controller authentication module 454 may comprise one or more components that may be used to authenticate the controller 402 on a network. For example, the controller 402 may send an authentication request 418 to an authentication service 120 designated by the authentication service endpoint information included in the endpoint response 416. The controller 402 may include credentials that may be included in the authentication request 418. The authentication service 120 may verify the controller 402 by assessing the credentials. If the controller 402 is authorized to register on the network, the authentication service 120 may send the controller 402 a controller session token 422. The controller authentication module 454 may store the controller session token 422 into memory.

The controller connection service module 456 may comprise one or more components that may be used to register the location of the controller 402 and negotiate a link 444 to an electronic device 108. For example, the connection service module 456 may include a registration module 458 and a session initiation module 460.

The registration module 458 may determine a registration message 424 that the controller 402 may send to a connection service 126. The registration message 424 may identify the location of the controller 402, which the connection service 126 may then register. The registration message 424 may include the internal and external IP addresses of the controller 402 and the controller session token 422. The registration module 458 may periodically resend the registration message 424 to the connection service 126 in order to keep the connection to the connection service 126 alive and traceable back to the controller 402.

The session initiation module 460 may receive notifications that an electronic device 108 may be requesting a communication session with the controller 402 (e.g., in order to establish a link 444 for remote access). For example, the electronic device 108 may send a session request 136*a* to the connection service 126, which may send the session request 436*b* to the controller 402. The session request 436*b* may include a device session token 134 and the IP address of the electronic device 108. Additionally, the session request 436*b* may include device candidate link information 425*c*. Upon receiving the session request 436*b*, the session initiation module 460 may notify the controller link module 462 that a communication session has been requested.

The controller link module 462 may comprise one or more components that may be used to establish a link 444 with the electronic device 108. The controller link module 462 may determine controller candidate link information 423*b* based on the type of link 444 (e.g., direct or relay) that the controller 402 and the electronic device 408 may attempt to establish. The controller candidate link information 423*b* may include one or more IP addresses and port numbers that the electronic device 108 may choose to establish the link 444 to the controller 402. For example, if a direct link 444 may be established, the controller candidate link information 423*b* may include the IP address and port number associated with the controller 402. Additionally or alternatively, if a relay service link 444 may be established, the controller candidate link information 423*b* may include the IP address(es) and port numbers for one or more relay services. The controller 402 may include the controller candidate link information 423*b* in a session response 442*a* that may be sent to the connection service 126 and forwarded to the electronic device 108.

The controller link module 462 may attempt to establish a link 444 based on the controller candidate link information 423*b* and the device candidate link information 425*c*. In one configuration, the controller link module 462 may attempt to establish a direct link 444 with the electronic device 108. In another configuration, the controller link module 462 may attempt to establish a relay link 444 with the electronic device 108. In yet another configuration, the controller link module 462 may first attempt to establish a direct link 444 with the electronic device 108, and if the direct link 444 may not be established, the controller link module 462 may attempt to establish a relay link 444.

Upon establishing the link 444 with the electronic device 108, the controller 402 may receive an automation message 446 sent by the electronic device 108. For example, the automation message 446 may include automation instructions that may be implemented by the controller 402. The configuration in FIG. 4 depicts an automation message 446 arriving at the controller 402 across the link 444. It will be appreciated that additional automation messages 446 may be received by the controller 402. Furthermore, the controller 402 may also send messages to the electronic device 108 across the link 444, thus enabling two-way communication between the controller 402 and the electronic device 108.

The automation module 406 may comprise one or more components used by the controller 402 to perform automation functions. The controller 402 may receive the automation message 446, which may be conveyed to the automation module 406 in order to execute an automation task. For example, the automation module 406 may determine control messages that may be sent to one or more automation devices 121. Examples of automation devices 121 include appliances (e.g., refrigerators, dishwashers, washing machines, dryers, air conditioning units, furnaces, pool equipment, sprinkling system controllers, thermostats, lighting controllers, security systems, audio systems, entertainment systems, telephone systems, etc.) and other devices. In some configurations, all of the automation devices 121 may be included in and/or may be attached to a single structure (e.g., house, building, etc.).

The controller 402 may communicate with the one or more automation devices 121 as described above in FIG. 1. For example, the controller 402 may communicate with one or more automation devices 121 with one or more wired and/or wireless links. For instance, the controller 402 may transmit and/or receive electromagnetic signals using one or more antennas. Furthermore, an automation device 121 may also transmit and/or receive electromagnetic signals using one or more antennas. For instance, the controller 402 may wirelessly send control messages using an antenna, which the automation device may receive using an antenna.

The controller 402 may also communicate with an automation device 121 over a network. Examples of the network include Local Area Networks (LANs), Wide Area Networks (WANs), the Internet, wireless networks, wired networks and/or any combination of the foregoing. The controller 402 may send control messages to an automation device 121 using the network. The controller 402 may additionally or alternatively receive response messages from the automation devices 121 using the network.

Figure 5:
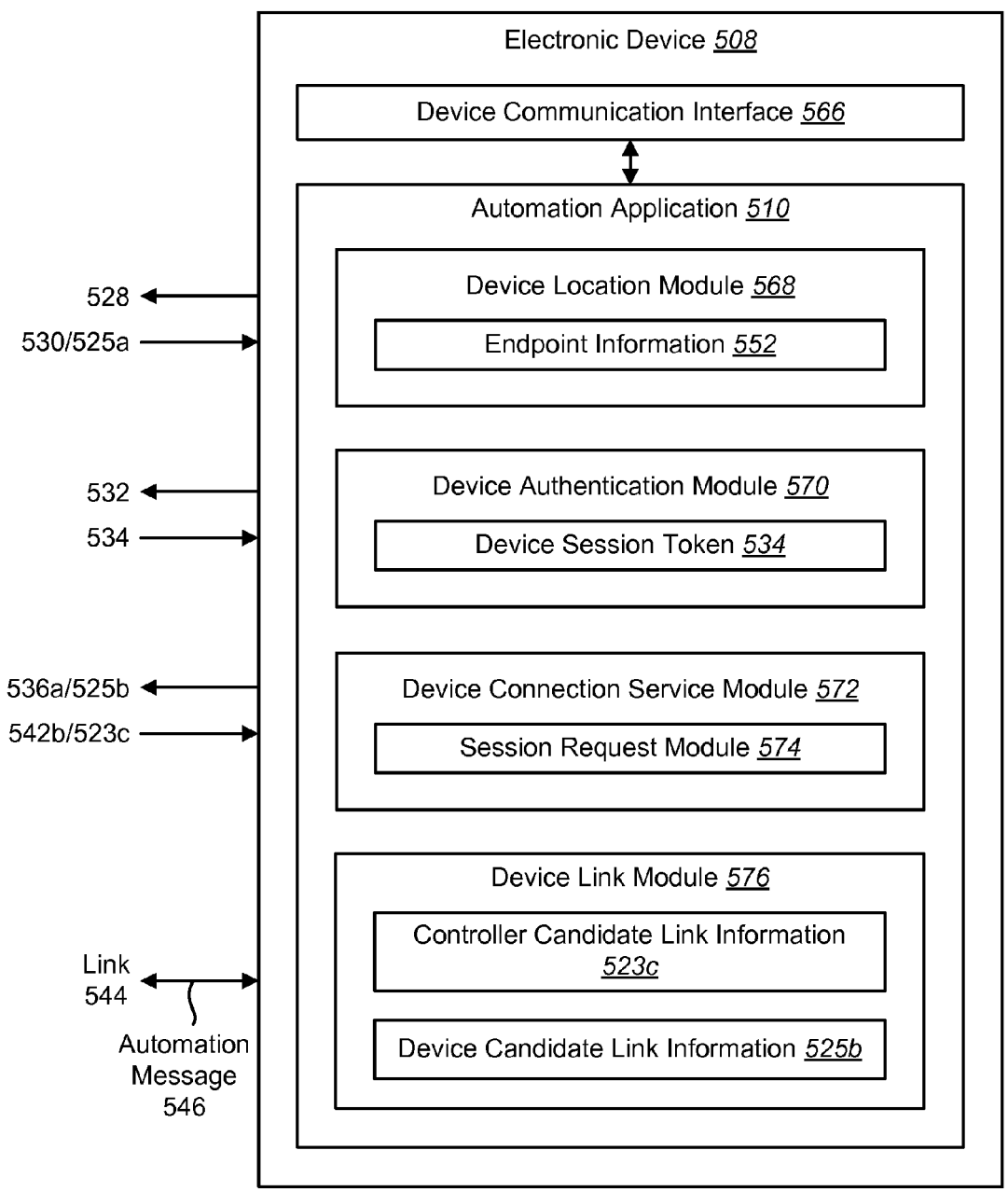
FIG. 5 is a block diagram illustrating one configuration of an electronic device in which systems and methods for providing secure remote access may be implemented.

FIG. 5 is a block diagram illustrating one configuration of an electronic device 508 in which systems and methods for providing secure remote access may be implemented. Examples of the electronic device 508 that may utilize the systems and methods disclosed herein include desktop computers, laptop computers, tablet devices, netbooks, cellular phones, smart phones, Personal Digital Assistants (PDAs), etc. The electronic device 508 may include one or more device communication interfaces 566 and one or more automation applications 510.

The device communication interface 566 may comprise one or more components used by the electronic device 508 to communicate with other electronic devices. For example, the device communication interface 566 may include a USB port, an HDMI port, an IR receiver/transmitter and/or an IEEE 1394 port, an antenna port, etc. Additionally or alternatively, the device communication interface 566 may comprise one or more components used by the electronic device 508 to communicate with other electronic devices over a network. For example, the device communication interface 566 may include an Ethernet port, Wi-Fi transceiver, USB port, wireless modem, etc.

The automation application 510 may comprise one or more components used by the electronic device 508 to establish a link 544 with the controller 102 for secure remote access to the controller 102. The automation application 510 may include a device location module 568, a device authentication module 570, a device connection service module 572 and a device link module 576. The automation application 510 may send and/or receive messages through the device communication interface 566. The automation application 510 may comprise software and hardware components. For example, the automation application 510 may comprise a program that may be run on the electronic device 508 (e.g., an app on a smart phone).

The device location module 568 may comprise one or more components that may be used to obtain endpoint information 552 for various services that may facilitate secure remote access to the controller 102. For example, the device location module 568 may send an endpoint request 528 to a location service 114. The location service 114 may include endpoint information for one or more authorization service endpoints, connection service endpoints and relay service endpoints. The electronic device 508 may receive an endpoint response 530 from the location service 114. The device location module 568 may store the endpoint information 552 into memory. Additionally, the one or more endpoint responses 530 may include device candidate link information 525a, which may include IP addresses, port numbers, protocols and descriptions of the type of IP address (e.g., host, relay, server reflexive, etc.) to which the controller 502 may attempt to establish a link 544 with the electronic device 508.

The device authentication module 570 may comprise one or more components that may be used to authenticate the electronic device 508 on a network. For example, the electronic device 508 may send an authentication request 532 to an authentication service 120 designated by the authentication service endpoint information included in the endpoint response 530. The electronic device 508 may include credentials that may be included in the authentication request 532. The authentication service 120 may verify the electronic device 508 by assessing the credentials. If the electronic device 508 is authorized to access the controller 102, the authentication service 120 may send the electronic device 508 a device session token 534. The device authentication module 570 may store the device session token 534 into memory.

The device connection service module 572 may comprise one or more components that may be used to negotiate a link 544 to the controller 102. For example, the device connection service module 572 may include a session request module 574. The session request module 574 may send a session request 536a to the connection service 126. The session request 536a may include the device session token 534 and the IP address of the electronic device 108. Additionally, the session request 536a may include device candidate link information 525b, which may include the IP address and port number of the electronic device 508. After the connection service 126 verifies that the electronic device 508 has authorization to connect to the controller 102 (e.g., checking the device session token 534 via the authentication service 120), the connection service 126 may send the session request 536a to the controller 102.

The device link module 576 may comprise one or more components that may be used to establish a link 544 with the controller 102. For example, the device link module 576 may receive controller candidate link information 523c that may be sent from the controller 102 and forwarded by the connection service 126. The controller candidate link information 523c may include one or more IP addresses and port numbers that the electronic device 508 may choose from to establish the link 544 to the controller 102. If the controller candidate link information 523c includes information for a direct link 544, the device link module 576 may attempt to establish a link 544 directly with the controller 102 based on the controller IP address and port number that may be included in the controller candidate link information 523c. In another configuration, if the controller candidate link information 523c includes information for a relay service link 544, the device link module 576 may attempt to establish a link 544 with a relay service based on the relay service IP address and port number that may be included in the controller candidate link information 523c. If a relay service link 544 is indicated by the controller candidate link information 523c, the controller candidate link information 523c may include the IP address and port number for one or more relay services. The device link module 576 may then select one relay service through which it may establish the link 544 to the controller 102. In yet another configuration, the device link module 576 may first attempt to establish a direct link 544 with the controller 102, and if the direct link 544 may not be established, the device link module 576 may attempt to establish a relay link 544.

Upon establishing the link 544 with the controller 102, the electronic device 508 may send an automation message 546 to the controller 102. For example, the automation message 546 may include automation instructions that may be implemented by the controller 102. The configuration in FIG. 5 depicts the electronic device 508 sending an automation message 546 across the link 544. It will be appreciated that additional automation messages 546 may be sent by the electronic device 508. Furthermore, the electronic device 508 may also receive messages from the controller 102 across the link 544, thus enabling two-way communication between the controller 102 and the electronic device 508.

Figure 6:
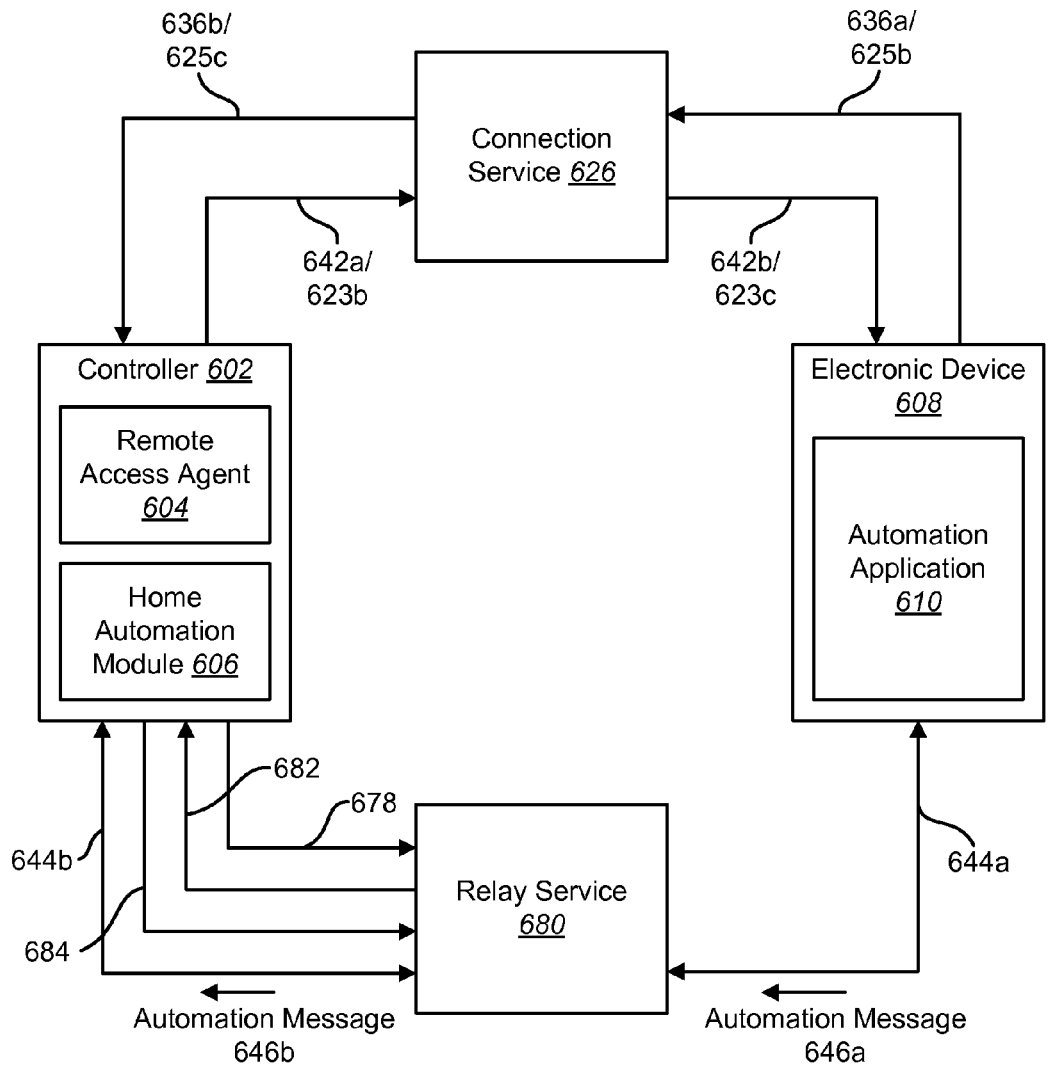
FIG. 6 is a block diagram illustrating one configuration of a relay service that may be utilized in some configurations of the systems and methods disclosed herein.

FIG. 6 is a block diagram illustrating one configuration of a relay service 680 that may be utilized in some configurations of the systems and methods disclosed herein. A controller 602 and an electronic device 608 may be in electronic communication with a connection service 626. The controller 602 may include a remote access agent 604 and an automation module 606, which may be configured as described above in FIG. 4 in some configurations. The electronic device 608 may include an automation application 610, which may be configured as described above in FIG. 5 in some configurations.

The electronic device 608 may send a session request 636a to the connection service 626. The session request 636a may indicate that the electronic device 608 requests to establish a communication session with the controller 602. Additionally, the session request 636a may include device candidate link information 625b, which may include the IP address and port number of the electronic device 508. The electronic device 608 may obtain device service endpoint information 625b from a location service 114. The connection service 626 may verify the authorization of the electronic device 608 through an authentication service 120. If the electronic device 608 is authorized to connect to the controller 602, then the connection service 626 may send the session request 636b and the device service endpoint information 625c to the controller 602.

Upon receiving the session request 636b, the controller 602 may determine controller candidate link information 623b based on the link that may be established with the electronic device 608. In one configuration, the controller 602 may have received controller candidate link information 123a in an endpoint response 116 received from the location service 114. In another configuration, the controller 602 may contact the location service 114 after receiving the session request 636b in order to obtain the controller candidate link information 123a. In another configuration, the controller 602 may include its own information in the controller candidate link information 123a in order to attempt to establish a direct link 644 (e.g., peer-to-peer link) with the electronic device 608.

Additionally or alternatively, the controller 602 may allocate a relay link 644a-b. The controller 602 may send an allocation request 678 to the relay service 680. The relay service 680 may be a service that may act as an intermediary between the controller 602 and the electronic device 608. The allocation request 678 may include the IP address and port number of the controller 602 that may be used to connect to the relay service 680. In response to the allocation request 678, the relay service 680 may allocate resources and determine an IP address(es) and port number(s) on the relay service 680 to link the controller 602 and the electronic device 608. The relay service 680 may send an allocation response 682 to the controller 602. The allocation response 682 may include the IP address(es), port number(s), protocols and address types of the relay service 680 to which the controller 602 and the electronic device 608 may connect. The controller 602 may include the IP address(es) and port number(s) of the relay service 680 that were included in the allocation response 682 in the controller candidate link information 623b.

The controller 602 may send controller candidate link information 623b that may indicate how the electronic device 608 may establish a link to the controller 602. For example, the controller 602 may send a session response 642a to the connection service 626. The session response 642a may include the controller candidate link information 623b. The connection service 626 may then send the session response 642b and controller candidate link information 623c to the electronic device 608.

Upon receiving the controller candidate link information 623c, the electronic device 608 may attempt to establish a link 644a-b to the controller 602. For example, if the controller candidate link information 623c indicates that the controller 602 and the electronic device 608 may establish a link 644a-b through the relay service 680, then the electronic device 608 may establish a link 644a to the relay service 680 based on the IP address and port number included in the controller candidate link information 642b. Additionally, the electronic device 608 may provide a device session token 134 to the relay service 680 in order to verify that the electronic device 608 is authorized to access the controller 602. The relay service 680 may request a link 644b to the controller 602 based on the controller IP address included in the allocation request 678. Upon connecting to the controller 602, the relay service 680 may receive a binding 684 from the controller 602, which may bind the link 644a-b. The binding 684 may be a virtual connection that may be transparent to the home automation module 606 and the automation application 610. Once the link 644a-b is established, the electronic device 608 may send an automation message 646a across the link 644a to the relay service 680. The relay service 680 may then send the automation message 646b across the link 644b to the controller 602.

It will be appreciated that the controller 102 may choose from a plurality of relay services 680. Therefore, the IP addresses and port numbers for the plurality of relay services 680 may be included in the controller candidate link information 623b. In some configurations, a plurality of relay services 680 may be linked together in order to form a chain of relay services 680 linked between the controller 602 and the electronic device 608.

Figure 7:
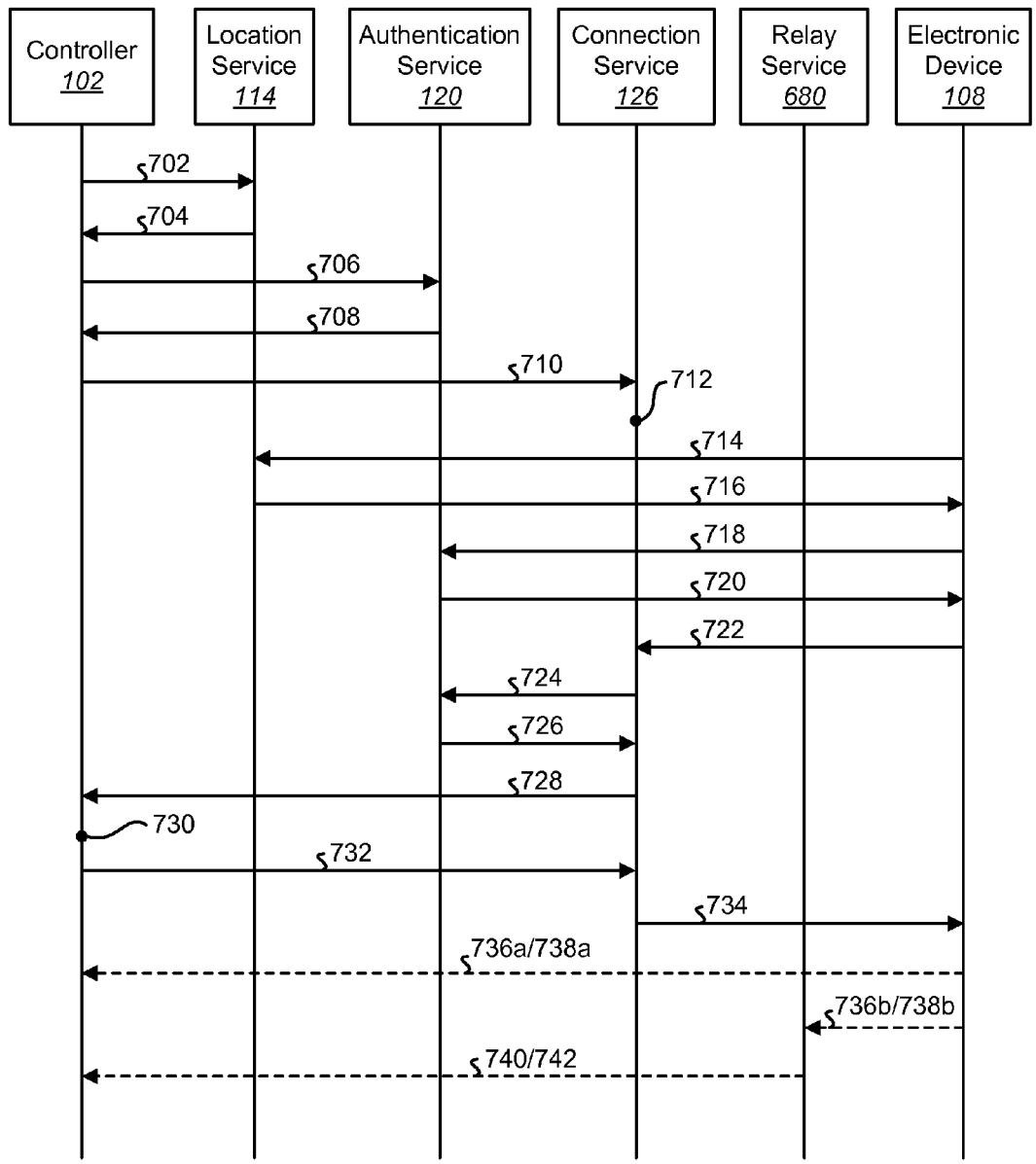
FIG. 7 is a thread diagram illustrating one configuration of a sequence of events in which systems and methods for providing secure remote access may be implemented.

FIG. 7 is a thread diagram illustrating one configuration of a sequence of events in which systems and methods for providing secure remote access may be implemented. A controller 102 may send 702 an endpoint request 112 to a location service 114. The controller 102 may receive 704 an endpoint response 116 from the location service 114. The endpoint response 116 may include authentication service endpoint information, connection service endpoint information and relay service endpoint information. Additionally, the endpoint response 116 may include controller candidate link information 123a.

The controller 102 may send 706 an authentication request 118 to an authentication service 120 based on the authentication service endpoint information. After the authentication service 120 authenticates and verifies that the controller 102 may register its location, the controller 102 receives 708 a controller session token 122 from the authentication service 120.

The controller 102 may send 710 a registration message 124 to a connection service 126 based on the connection service endpoint information. The connection service 126 may register 712 the location of the controller 102. Additionally, the connection service 126 may verify the controller session token 122 before registering 712 the controller 102.

An electronic device 108 may send 714 an endpoint request 128 to the location service 114. The electronic device 108 may receive 716 an endpoint response 130 from the location service 114. The endpoint response 130 may include authentication service endpoint information and connection service endpoint information. Additionally, the endpoint response 130 may include device candidate link information 125a.

The electronic device 108 may send 718 an authentication request 132 to an authentication service 120 based on the authentication service endpoint information. After authenticating and verifying that the electronic device 108 may access the controller 102, the authentication service 120 may send 720 a device session token 134 to the electronic device 108.

The electronic device 108 may send 722 a session request 136a to the connection service 126 based on the connection service endpoint information. The session request 136a may include the IP address of the electronic device 108 and the device session token 134. The session request 136a may additionally include the device candidate link information 125b. The connection service 126 may send 724 a device verification request 138 to the authentication service 120. After authenticating and verifying that the electronic device 108 may access the controller 102, the authentication service 120 may send 726 a device verification message 140 to the connection service 126. The controller 102 may receive 728 a session request 136b and device candidate link information 125c from the connection service 126 based on the registered controller location.

The controller 102 may determine 730 controller candidate link information 123b based on the session request 136b. The controller candidate link information 123b may include the IP address and port number of the controller 102 in order to attempt to establish a direct link 144 between the controller 102 and the electronic device 108. Additionally, the controller candidate link information 123b may include the IP address(es) and port number(s) of one or more relay services 680 if a relay link 144 may be established between the controller 102 and the electronic device 108.

The controller 102 may send 732 the controller candidate link information 123b to the connection service 126. For example, the controller 102 may include the controller candidate link information 123b in the session response 142a. The controller 102 may then send 732 the session response 142a to connection service 126. The connection service 126 may then send the session response 142b and the controller candidate link information 123c to the electronic device 108.

If the controller candidate link information 123c indicates a direct link 144, the electronic device 108 may connect 736a directly to the controller 102 and then send 738a an automation message 146 to the controller 102. Alternatively, if the controller candidate link information 123c indicates a relay service link 144, the electronic device 108 may connect 736b to the relay service 680 and send 738b the automation message 146 to the relay service 680. The relay service 680 may then connect 740 to the controller 102 and the controller 102 may receive 742 the automation message 146 from the relay service 680.

Figure 8:
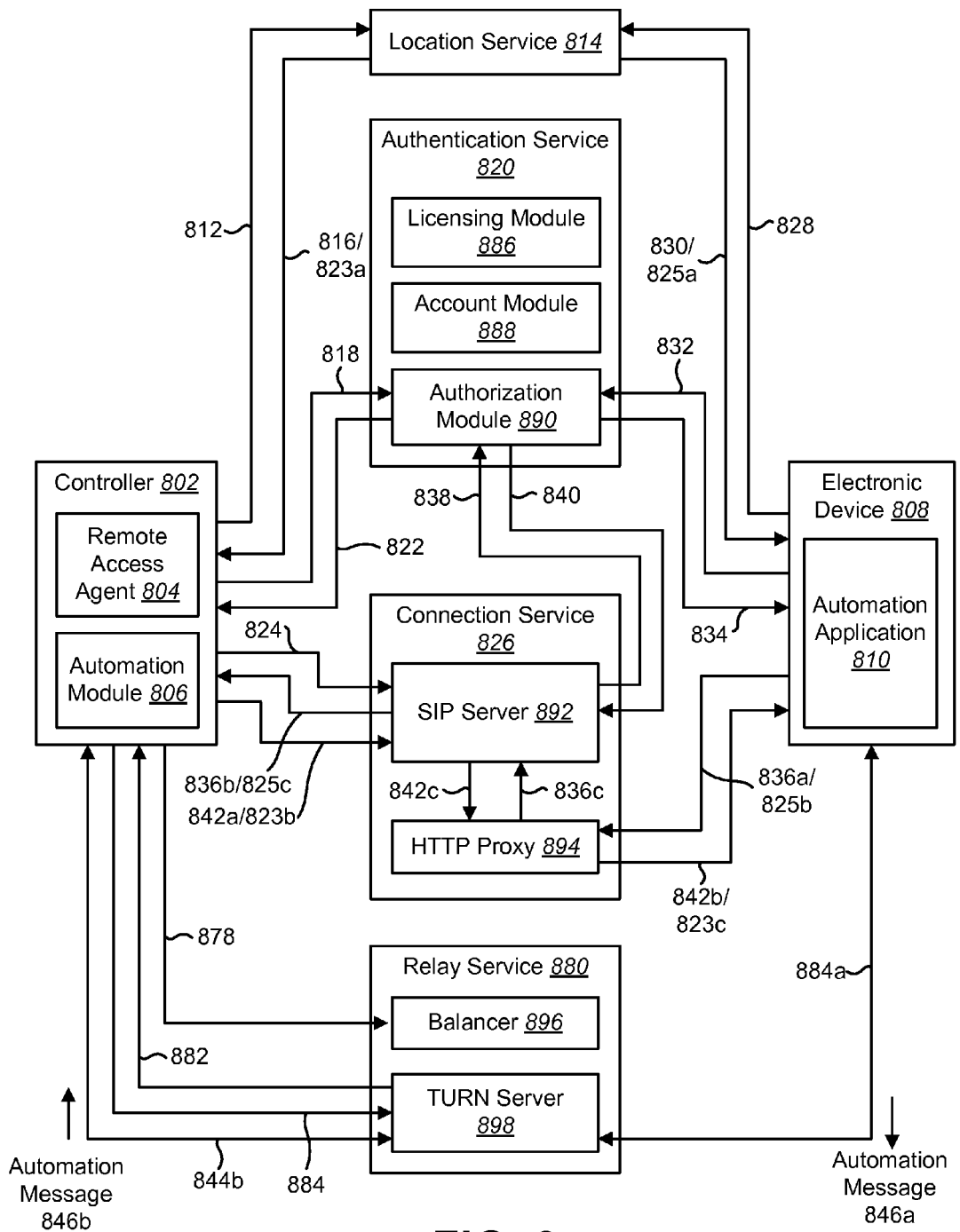
FIG. 8 is a block diagram illustrating a more specific configuration of a controller and an electronic device in which systems and methods for providing secure remote access may be implemented.

FIG. 8 is a block diagram illustrating a more specific configuration of a controller 802 and an electronic device 808 in which systems and methods for providing secure remote access may be implemented. The controller 802 may include a remote access agent 804 and an automation module 806 (e.g., a home automation module). The remote access agent 804 may facilitate secure remote access to the controller 802. The automation module 806 may perform automation tasks. The controller 802 may include communication functionality that may enable the controller 802 to communicate over a network.

The controller 802 may send one or more endpoint requests 812 to a location service 814 and receive one or more endpoint responses 816 from the location service 814. This may be accomplished as described above in FIG. 1. The controller 802 may receive authorization service endpoint information, connection service endpoint information and relay service endpoint information. Additionally, the endpoint response 816 may include controller candidate link information 823a.

The controller 802 may request network authentication by sending an authentication request 818 to an authentication service 820 based on the authentication service endpoint information. The authentication service 820 may include a licensing module 886, an account module 888 and an authorization module 890. After receiving the authentication request 818, the authorization module 890 may verify that the controller 802 has authorization to register its location with a connection service 826. Additionally, the licensing module 886 may verify that the controller 802 has a valid license. Also, the account module 888 may verify that the controller 802 belongs to a valid and active account. If the controller 802 is authorized to register on the network, the authentication service 820 may send the controller 802 a controller session token 822.

The controller 802 may send a registration message 824 to the connection service 826. The registration message 824 may include the internal and external IP addresses of the controller 802 and the controller secure token 822. The connection service 826 may include an SIP server 892. The controller 802 may send the registration message 824 to the SIP server 892, which may register the location of the controller 802. The controller 802 may periodically resend (e.g.,) a registration message 824 every three minutes to the connection service 826 in order to keep the connection to the connection service 826 alive and traceable back to the controller 802.

An electronic device 808 may include an automation application 810. The electronic device 808 may send an endpoint request 828 to the location service 814. The location service 814 may send an endpoint response 830 to the electronic device 808. This may be accomplished as described above in FIG. 1. The endpoint response 830 may include endpoint information for one or more authorization service endpoints and connection service endpoints. Additionally, the endpoint response 830 may include device candidate link information 825*a*.

The electronic device 808 may send an authentication request 832 to the authentication service 820 in order to be authenticated on the network. The electronic device 808 may contact the authentication service 820 designated by the authentication service endpoint information received from the location service 814. After receiving the authentication request 832, the authorization module 890 may verify that the electronic device 808 has authorization to access the controller 802. Additionally, the licensing module 886 may verify that the electronic device 808 has a valid license. Also, the account module 888 may verify that the electronic device 808 belongs to a valid and active account. If the electronic device 808 is authorized to access the controller 802, the authentication service 820 may send the electronic device 808 a device session token 834.

The electronic device 808 may contact the connection service 826 in order to negotiate a link 844 to the controller 802. For example, the electronic device 808 may send a session request 836*a* to the connection service 826 based on the connection service endpoint information received from the location service 814. The session request 636*a* may additionally include the device candidate link information 825*b*. An HTTP proxy 894 may receive the session request 836*a*. The HTTP proxy 894 may send the session request 836*c* to the SIP server 892. The SIP server 892 may send a verification request 838 to the authentication service 820. If the authentication service 820 verifies that the electronic device 808 is authorized to access the controller 802, the authentication service 820 may send a verification message 840 back to the SIP server 892. Upon receiving the verification message 840, the SIP server 892 may send the session request 836*b* and the device candidate link information 825*c* to the controller 802 based on the IP address designated by the registration message 824 sent by the controller 802.

When the controller 802 receives the session request 836*b*, the controller 802 may determine controller candidate link information 823*b* based on the type of links that may be established with the electronic device 808. For example, the controller 802 and the electronic device 808 may attempt to establish a direct link (e.g., peer-to-peer communication) with the electronic device 808. Additionally or alternatively, the controller 802 and the electronic device 808 may attempt to establish a relay link 844*a-b* to the electronic device 808 via a relay service 880 to which both the controller 802 and the electronic device 808 may connect.

In the case of a relay service link 844*a-b*, the controller 802 may contact a relay service 880, as described above in FIG. 6. In one configuration, the relay service 880 may include a balancer 896 and a TURN Server 898. The controller 802 may send an allocation request 878 to the balancer 896. The balancer 896 may improve network performance and distribute the load associated with the relay service 880 in order to facilitate better service quality. The TURN server 898 may employ the Traversal Using Relays around NAT (TURN) protocol, which may allow for the controller 802 and the electronic device 808 behind a NAT and/or firewall to receive incoming data over TCP or UDP connections. The TURN Server 898 may provide IP relay services between the controller 802 and the electronic device 808. The TURN Server 898 performance may be limited by network bandwidth and processing power (e.g., Central Processing Unit (CPU) processing power). Therefore, the balancer 896 may distribute the workload (via a software service, for example) across multiple TURN Servers 898 organized in a service cluster. The balancer 896 may facilitate the use of the TURN protocol and provide additional security to prevent unauthorized usage of the TURN Server service cluster. The TURN server 898 may provide a way for incoming connections, requests and/or messages to traverse a firewall that does may not allow incoming connections. In one configuration, the TURN server 898 may be hosted in a globally accessible cluster so that it can be reached by both the controller 802 and the electronic device 808. Additionally, use of the TURN server 898 may require secured private keys and connection information that may be provided by the authentication service 820 and/or the connection service 826.

In response to the allocation request 878, the relay service 880 may allocate resources and determine an IP address(es) and port number(s) to link the controller 802 and the electronic device 808. The TURN server 898 may send an allocation response 882 to the controller 802. The allocation response 882 may include the IP address(es) and port number(s) of the TURN server 898, to which the controller 802 and the electronic device 808 may connect. The controller 802 may include the IP address(es) and port number(s) of the TURN server 898 that were included in the allocation response 882 in the controller candidate link information 823*b*.

After determining controller candidate link information 823*b* for the link to the electronic device 808, the controller 802 may include the controller candidate link information 823*b* in a session response 842*a* that may be sent to the connection service 826. The controller candidate link information 823*b* may include one or more IP addresses and port numbers that the electronic device 808 may choose to establish a link to the controller 802. For example, in the configuration depicted in FIG. 8, a relay service link 844*a-b* may be established. Therefore, the controller candidate link information 823*b* may include the IP address and port number for one or more relay services 880. The session response 842*a* may be received by the SIP server 892, which then sends the session response 842*c* through the HTTP proxy 894. The HTTP proxy may then send the session response 842*b* and the controller candidate link information 823*c* to the electronic device 808.

The electronic device 808 may select an IP address and port number designated by the controller candidate link information 823*c* in order to establish the link to the controller 802. For example, the electronic device 808 may select from the IP addresses and port numbers associated with the one or more relay services 880 in order to establish the link 844*a-b* to the controller 802. The electronic device 808 may establish the link 844*a-b* through the TURN server 898 based on the IP address and port number included in the controller candidate link information 823*c*. Additionally, the electronic device 808 may provide a device session token 134 to the relay service 880 in order to verify that the electronic device 808 is authorized to access the controller 802. The relay TURN server 898 may request a link 844*b* to the controller 802 based on the controller IP address included in the allocation request 878. After the TURN server 898 connects to the controller 802, the controller 802 may bind the link 844*a-b* by sending a binding 884 to the relay service 880. Once the link 844*a-b* is established, the electronic device 808 may send an automation message 846*a* across the link 844*a* to the TURN server 898. The TURN server 898 may then send the automation message 846*b* across the link 844*b* to the controller 802.

Figure 9:
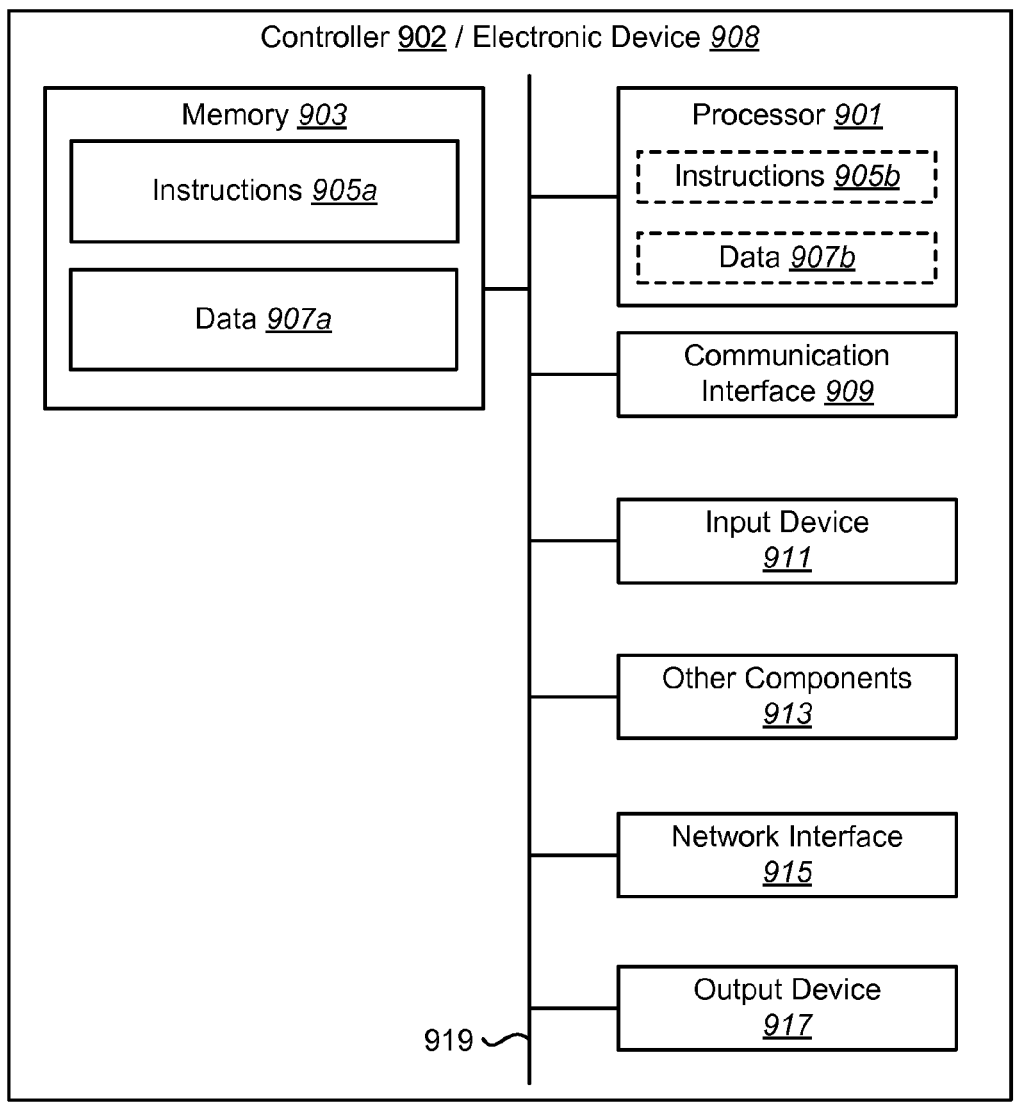
FIG. 9 is a block diagram illustrating various components that may be utilized in a controller and/or an electronic device.

FIG. 9 is a block diagram illustrating various components that may be utilized in a controller 902 and/or an electronic device 908. Although only the controller 902 and/or the electronic device 908 are shown, the configurations herein may be implemented in a distributed system using many electronic devices. A controller 902 and/or an electronic device 908 may include the broad range of digital computers, including microcontrollers, hand-held computers, personal computers, servers, mainframes, supercomputers, minicomputers, workstations and any variation or related device thereof. In some configurations, the controller 902 and/or electronic device 908 may be appliances. Additionally or alternatively, the controller 902 and/or electronic device 908 may be an embedded device inside an otherwise complete device (e.g., within an appliance).

The controller 902 and/or electronic device 908 is/are shown with a processor 901 and memory 903. The processor 901 may control the operation of the controller 902 and/or electronic device 908 and may be embodied as a microprocessor, a microcontroller, a digital signal processor (DSP) or other device known in the art. The processor 901 typically performs logical and arithmetic operations based on program instructions 905a and/or data 907a stored within the memory 903. The instructions 905a in the memory 903 may be executable to implement the methods described herein. FIG. 9 illustrates instructions 905b and/or data 907b being loaded onto the processor 901. The instructions 905b and/or data 907b may be the instructions 905a and/or data 907a (or portions thereof) stored in memory 903.

The controller 902 and/or electronic device 908 may also include one or more communication interfaces 909 and/or network interfaces 915 for communicating with other electronic devices. The communication interface(s) 909 and the network interface(s) 915 may be based on wired communication technology and/or wireless communication technology, such as ZigBee®, WiMax®, WiFi®, Bluetooth® and/or cellular protocols, such as GSM®, etc.

The controller 902 and/or electronic device 908 may also include one or more input devices 911 and one or more output devices 917. The input devices 911 and output devices 917 may facilitate user input/user output. Other components 913 may also be provided as part of the controller 902 and/or electronic device 908.

Instructions 905a and data 907a may be stored in the memory 903. The processor 901 may load and execute instructions 905b from the instructions 905a in memory 903 to implement various functions. Executing the instructions 905a may involve the use of the data 907a that is stored in the memory 903. The instructions 905b and/or data 907b may be loaded onto the processor 901. The instructions 905 are executable to implement the one or more methods shown herein and the data 907 may include one or more of the various pieces of data described herein.

The memory 903 may be any electronic component capable of storing electronic information. The memory 903 may be embodied as random access memory (RAM), read-only memory (ROM), magnetic disk storage media, optical storage media, flash memory devices in RAM, on-board memory included with the processor, EPROM memory, EEPROM memory, an ASIC (Application Specific Integrated Circuit), registers and so forth, including combinations thereof. The various components of the controller 902 and/or electronic device 908 may be coupled together by a bus system 919, which may include a power bus, a control signal bus and a status signal bus, in addition to a data bus. However, for the sake of clarity, the various buses are illustrated in FIG. 9 as the bus system 919.

In the above description, reference numbers have sometimes been used in connection with various terms. Where a term is used in connection with a reference number, it may refer to a specific element that is shown in one or more of the Figures. Where a term is used without a reference number, it may refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable or processor-readable statement(s). For example, the terms "instructions" and "code" may refer to one or more programs, routines, sub-routines, functions, procedures, etc. "Instructions" and "code" may comprise a single computer-readable statement or many computer-readable statements.

The term "computer-readable medium" refers to any available medium that can be accessed by a computer or processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. A computer-readable medium may be tangible and non-transitory. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A method for providing secure remote access by a controller, comprising:
    sending one or more endpoint requests;
    receiving authentication service endpoint information and connection service endpoint information;
    requesting authentication based on the authentication service endpoint information, wherein requesting authentication comprises requesting license validation;
    receiving, based at least upon the authentication request, a controller session token including at least a unique identifier associated with the controller;
    sending one or more registration messages based on the connection service endpoint information, the one or more registration messages including at least an internal and an external internet protocol (IP) address associated with the controller and the controller session token, wherein registering with a connection service allows port forwarding to be avoided;
    receiving a session request, wherein receiving the session request is based on the controller session token, and wherein the session request comprises device candidate link information and a device session token;
    determining controller candidate link information, wherein the controller candidate link information comprises an internet protocol (IP) address and a port;
    sending the controller candidate link information; and
    receiving an automation message based on the controller candidate link information, the automation message including at least one or more instructions to initiate one or more automation tasks.

2. The method of claim 1, wherein receiving the automation message comprises receiving the automation message via at least one of a relay link and a peer-to-peer link.

3. A method for providing secure remote access to a controller by an electronic device, comprising:
    sending one or more endpoint requests;
    receiving authentication service endpoint information and connection service endpoint information;
    requesting authentication based on the authentication service endpoint information, wherein requesting authentication comprises requesting license validation based on electronic device credentials;
    receiving, based upon the authentication request, a device session token;
    sending a session request based on the connection service endpoint information, the session request including at least device candidate link information, the device session token and an internet protocol (IP) address associated with the electronic device, wherein using a connection service allows port forwarding to be avoided;
    receiving controller candidate link information, wherein the controller candidate link information comprises an internet protocol (IP) address and a port; and
    sending an automation message based on the controller candidate link information, the automation message including at least one or more instructions to initiate one or more automation tasks.

4. The method of claim 3, wherein sending the automation message comprises sending the automation message via at least one of a relay link and a peer-to-peer link.

5. A controller for providing secure remote access, comprising:
    a processor;
    memory in electronic communication with the processor;
    instructions stored in the memory, the instructions being executable to:
        send one or more endpoint requests;
        receive authentication service endpoint information and connection service endpoint information;
        request authentication based on the authentication service endpoint information, wherein requesting authentication comprises requesting license validation;
        receive, based at least upon the authentication request, a controller session token including at least a unique identifier associated with the controller;
        send one or more registration messages based on the connection service endpoint information, the one or more registration messages including at least an internal and external internet protocol (IP) address associated with the controller and the controller session token, wherein registering with a connection service allows port forwarding to be avoided;
        receive a session request, wherein receiving the session request is based on the controller session token, and wherein the session request comprises device candidate link information and a device session token;
        determine controller candidate link information, wherein the controller candidate link information comprises an internet protocol (IP) address and a port;
        send the controller candidate link information; and
        receive an automation message based on the controller candidate link information, the automation message including at least one or more instructions to initiate one or more automation tasks.

6. The controller of claim 5, wherein receiving the automation message comprises receiving the automation message via at least one of a relay link and a peer-to-peer link.

7. An electronic device for providing secure remote access to a controller, the electronic device comprising:
    a processor;
    memory in electronic communication with the processor;
    instructions stored in the memory, the instructions being executable to:
        send one or more endpoint requests;
        receive authentication service endpoint information and connection service endpoint information;
        request authentication based on the authentication service endpoint information, wherein requesting authentication comprises requesting license validation based on electronic device credentials;

receive, based at least upon the authentication request, a device session token;

send a session request based on the connection service endpoint information, the session request including at least device candidate link information, the device session token and an internet protocol (IP) address of the electronic device, wherein using a connection service allows port forwarding to be avoided;

receive controller candidate link information, wherein the controller candidate link information comprises an internet protocol (IP) address and a port; and send an automation message based on the controller candidate link information, the automation message including at least one or more instructions to initiate one or more automation tasks.

8. The electronic device of claim 7, wherein sending the automation message comprises sending the automation message via at least one of a relay link and a peer-to-peer link.

* * * * *